US012524965B2

(12) United States Patent
Miyamoto

(10) Patent No.: US 12,524,965 B2
(45) Date of Patent: Jan. 13, 2026

(54) GENERATION OF THREE-DIMENSIONAL (3D) BLEND-SHAPES FROM 3D SCANS USING NEURAL NETWORK

(71) Applicants: SONY GROUP CORPORATION, Tokyo (JP); SONY CORPORATION OF AMERICA, New York, NY (US)

(72) Inventor: Kohei Miyamoto, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 169 days.

(21) Appl. No.: 18/473,768

(22) Filed: Sep. 25, 2023

(65) Prior Publication Data

US 2025/0104358 A1 Mar. 27, 2025

(51) Int. Cl.
*G06T 19/20* (2011.01)
*G06T 5/70* (2024.01)
*G06T 7/11* (2017.01)
*G06T 17/20* (2006.01)

(52) U.S. Cl.
CPC .............. *G06T 17/205* (2013.01); *G06T 5/70* (2024.01); *G06T 7/11* (2017.01); *G06T 2207/10028* (2013.01); *G06T 2207/20084* (2013.01)

(58) Field of Classification Search
CPC . G06T 17/205; G06T 7/11; G06T 5/70; G06T 2207/10028; G06T 2207/20084
See application file for complete search history.

(56) References Cited

U.S. PATENT DOCUMENTS

| | | | | |
|---|---|---|---|---|
| 10,181,213 B2* | 1/2019 | Bullivant | ............... | G06N 3/004 |
| 10,783,690 B2* | 9/2020 | Sagar | ...................... | G06T 13/00 |
| 10,939,143 B2* | 3/2021 | Iyer | ....................... | G06F 16/483 |
| 11,354,844 B2* | 6/2022 | Sagar | .................... | G06T 15/503 |
| 11,836,837 B2* | 12/2023 | Hu | ......................... | G10L 21/10 |
| 11,893,671 B2* | 2/2024 | Sagar | ..................... | G06T 13/40 |
| 11,941,737 B2* | 3/2024 | Wang | ...................... | G06T 19/20 |
| 11,995,752 B2* | 5/2024 | Park | ..................... | G06F 3/04817 |
| 12,094,043 B2* | 9/2024 | Gagne | .................. | G06F 3/0346 |

(Continued)

OTHER PUBLICATIONS

Regateiro, et al., "Deep4D: A Compact Generative Representation for Volumetric Video", Frontiers in Virtual Reality, vol. 2, Article 739010, Nov. 1, 2021, 17 pages.

(Continued)

*Primary Examiner* — Cheng Yuan Tseng
(74) *Attorney, Agent, or Firm* — CHIP LAW GROUP

(57) ABSTRACT

An electronic device and a method for generation of three-dimensional (3D) blend-shapes from 3D scans using neural network are disclosed. The electronic device acquires a set of 3D scans including a body portion of an object. The electronic device determines a set of segments of the body portion from each 3D scan. The electronic device applies a neural network model on the acquired set of 3D scans. The electronic device determines a set of vertex difference vectors. Each vector of the determined set of vertex difference vectors corresponds to a 3D blend-shape. Each segment of the determined set of segments moves independently in the 3D blend-shape. The electronic device reconstructs a 3D mesh sequence. The electronic device re-trains the neural network model. The re-trained neural network model determines a set of 3D blend-shapes based on a set of input 3D scans.

16 Claims, 11 Drawing Sheets

(56) References Cited

U.S. PATENT DOCUMENTS

| | | | | |
|---|---|---|---|---|
| 12,131,407 B2* | 10/2024 | Wang | | G06N 3/08 |
| 12,159,346 B2* | 12/2024 | Selvet | | G06T 15/04 |
| 12,169,900 B2* | 12/2024 | Khakhulin | | G06N 3/096 |
| 12,182,922 B2* | 12/2024 | Valentin | | G06T 15/06 |
| 12,184,923 B2* | 12/2024 | Zhang | | G06V 40/171 |
| 12,198,374 B2* | 1/2025 | Sun | | G06V 40/11 |
| 12,277,670 B2* | 4/2025 | Noh | | G06N 3/045 |
| 2004/0095344 A1* | 5/2004 | Dojyun | | G06T 13/40 345/419 |
| 2017/0243387 A1* | 8/2017 | Li | | G06V 20/46 |
| 2020/0184721 A1* | 6/2020 | Ge | | G06N 3/045 |
| 2022/0164921 A1* | 5/2022 | Noh | | G06N 3/08 |
| 2022/0405996 A1* | 12/2022 | Shirai | | G02B 27/0093 |
| 2023/0062756 A1 | 3/2023 | Takeda et al. | | |
| 2023/0222721 A1* | 7/2023 | Chen | | G06T 13/40 345/419 |
| 2023/0237753 A1* | 7/2023 | Bradley | | G06T 13/40 345/419 |
| 2023/0260184 A1* | 8/2023 | Chen | | G06V 10/774 345/423 |
| 2024/0062467 A1* | 2/2024 | Sarkis | | G06V 10/82 |
| 2024/0078356 A1* | 3/2024 | Tiwari | | G06N 3/0455 |
| 2024/0087230 A1* | 3/2024 | Shetty | | G06T 17/00 |
| 2024/0221270 A1* | 7/2024 | Leyton | | A63F 13/92 |
| 2024/0355051 A1* | 10/2024 | Ahn | | G06T 19/20 |
| 2025/0061634 A1* | 2/2025 | Huang | | G06T 13/40 |
| 2025/0104358 A1* | 3/2025 | Miyamoto | | G06T 5/70 |

OTHER PUBLICATIONS

Casas, et al., "4D Video Textures for Interactive Character Appearance", vol. 33, No. 2, 2014, 10 pages.

* cited by examiner

GENERATION OF THREE-DIMENSIONAL (3D) BLEND-SHAPES FROM 3D SCANS USING NEURAL NETWORK

FIELD

Various embodiments of the disclosure relate to media processing. More specifically, various embodiments of the disclosure relate to generation of three-dimensional (3D) blend-shapes from 3D scans using neural network.

BACKGROUND

Advancements in the field of image processing have led to development of animated three-dimensional (3D) models. An animated 3D model may be created based on a plurality of blend-shapes. It may be appreciated that the blend-shapes may be used to deform portions of an object to create an expression. For example, based on a usage of blend-shapes, detailed facial movements may be reproduced on a 3D model. Thus, the generation of the blend-shapes may be an essential step for creation of the animated 3D models. Typically, the blend-shapes may be generated manually. Herein, animation designers may devote substantial effort to generate the blend-shapes. For example, the animation designers may analyze hundreds of 3D data shots taken in a photogrammetry studio to create blend-shapes. Therefore, the manual process of generating the blend-shapes may be labor intensive and time-consuming.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for generation of three-dimensional (3D) blend-shapes from 3D scans using neural network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
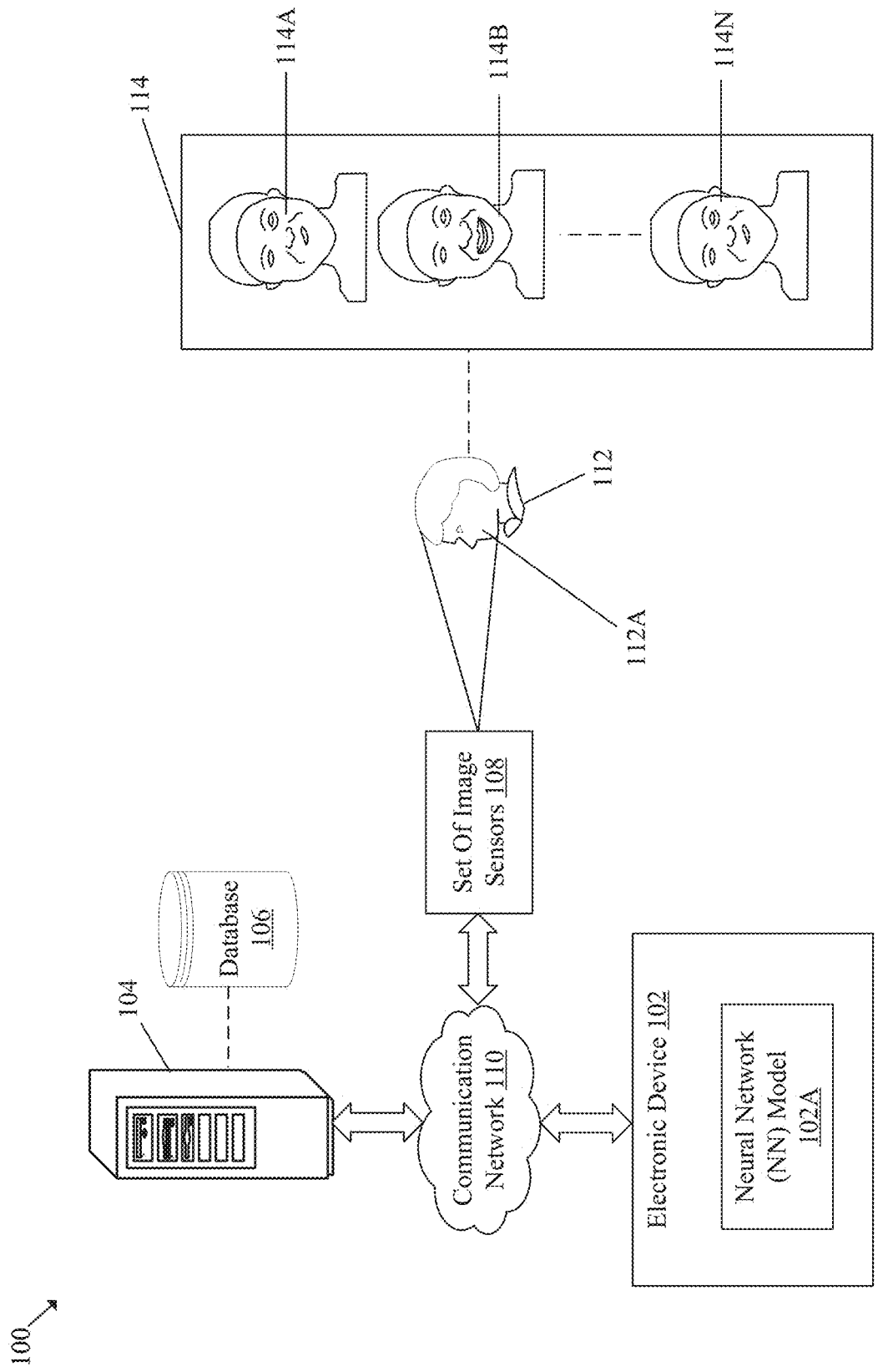
FIG. 1 is a block diagram that illustrates an exemplary network environment for generation of three-dimensional (3D) blend-shapes from 3D scans using neural network, in accordance with an embodiment of the disclosure.

The following described implementation may be found in an electronic device and method for generation of three-dimensional (3D) blend-shapes from 3D scans using neural network. Exemplary aspects of the disclosure may provide an electronic device that may acquire a set of 3D scans including a body portion of an object. The electronic device may determine a set of segments of the body portion from each 3D scan of the acquired set of 3D scans. The electronic device may apply a neural network (NN) model on the acquired set of 3D scans, based on the determined set of segments. The electronic device may determine a set of vertex difference vectors associated with the determined set of segments, based on the application of the NN model. Each vector of the determined set of vertex difference vectors may correspond to a 3D blend-shape associated with the determined set of segments. Further, each segment of the determined set of segments may be configured to move independently in the 3D blend-shape. The electronic device may reconstruct a 3D mesh sequence based on the determined set of vertex difference vectors. The electronic device may re-train the NN model based on the acquired set of 3D scans and the reconstructed 3D mesh sequence, such that the re-trained NN may be configured to determine a set of 3D blend-shapes based on a set of input 3D scans.

It may be appreciated that an animated 3D model may be created based on a plurality of blend-shapes. Herein, the blend-shapes may be used to deform portions of an object to create an expression. For example, based on a usage of blend-shapes, detailed facial movements may be reproduced on a 3D model. Thus, the generation of the blend-shapes may be an essential step for creation of the animated 3D models. Typically, the blend-shapes may be generated manually. Herein, animation designers may devote substantial effort to generate the blend-shapes. For example, the animation designers may analyze hundreds of 3D data shots taken in a photogrammetry studio to create blend-shapes. Therefore, the manual process of generating the blend-shapes may be labor intensive and time-consuming.

In order to address the aforesaid issues, the disclosed electronic device and method may generate 3D blend-shapes from 3D scans using neural network. The disclosed electronic device may use the NN model to automatically generate the blend-shapes that may perfectly reproduce a 3D mesh sequence. Herein, the disclosed electronic device may receive the set of 3D scans including the body portion, such as, the face of the object (for example, a person). In an example, a length of the set of 3D scans may be just "2"

minutes. The "2" minutes of 3D scan data may be sufficient to create high-fidelity blend-shapes. As the NN model may need to process only the "2" minutes of 3D the scan data, a computational workload on the NN model may be less. Based on the application of the NN model, the disclosed electronic device may determine the set of vertex difference vectors associated with the determined set of segments. Each vector of the determined set of vertex difference vectors may correspond to the 3D blend-shape associated with the determined set of segments and each segment of the determined set of segments may configured to move independently in the 3D blend-shape. Thus, the presence of artifacts in the boundary of each segment may be prevented. Further, the determined set of vertex difference vectors may optimally regenerate the 3D scan data. That is, the 3D mesh sequence may be reconstructed based on the determined set of vertex difference vectors.

It may be noted that the re-training of the NN model may ensure that the determined set of 3D blend-shapes may be associated with fine facial expressions. In some embodiments, the disclosed electronic device may re-train the NN model based on a smoothening function so that the boundaries of each segment may be connected smoothly. Further, the NN model may be re-trained based on a lasso (L1) regression function that may ensure that a number of the 3D scans in the set of input 3D scans that may be needed for determination of the set of 3D blend-shapes may be minimized. Therefore, a computational cost associated with determination of the set of 3D blend-shapes may be minimized. Therefore, the disclosed electronic device and method may automatically generate the 3D blend-shapes from the 3D scans using the NN model. Furthermore, a time required for generation of the 3D blend-shapes from the 3D scans using the NN model may be considerably lesser than a time required for generating the 3D blend-shapes from the 3D scans manually.

FIG. 1 is a block diagram that illustrates an exemplary network environment for generation of three-dimensional (3D) blend-shapes from 3D scans using a neural network (NN) model, in accordance with an embodiment of the disclosure. With reference to FIG. 1, there is shown a network environment 100. The network environment 100 may include an electronic device 102, a server 104, a database 106, a set of image sensors 108, and a communication network 110. The electronic device 102 may communicate with the server 104 and/or the set of image sensors 108 through one or more networks (such as, the communication network 110). The electronic device 102 may include a neural network (NN) model 102A. There is further shown, in FIG. 1, a user 112 and a face 112A of the user 112. The set of image sensors 108 may capture a set of three-dimensional (3D) scans 114 of the face 112A of the user 112. The set of 3D scans 114 may include a 3D scan 114A, a 3D scan 114A, . . . , and a 3D scan 114N.

Although FIG. 1 shows that the set of 3D scans 114 includes "N" 3D scans, the scope of the disclosure may not be so limited. The set of 3D scans 114 may include only two 3D scans or more than "N" 3D scans without departure from the scope of the disclosure.

The electronic device 102 may include suitable logic, circuitry, interfaces, and/or code that may be configured to acquire the set of 3D scans 114 including a body portion (such as, the face 112A) of an object (such as, the user 112). The electronic device 102 may determine a set of segments of the body portion, such as, the face 112A, from each 3D scan of the acquired set of 3D scans 114. The electronic device 102 may apply the NN model 102A on the acquired set of 3D scans 114, based on the determined set of segments. The electronic device 102 may determine the set of vertex difference vectors associated with the determined set of segments, based on the application of the NN model 102A. Each vector of the determined set of vertex difference vectors may correspond to a 3D blend-shape associated with the determined set of segments, and each segment of the determined set of segments may be configured to move independently in the 3D blend-shape. The electronic device 102 may reconstruct a 3D mesh sequence based on the determined set of vertex difference vectors. The electronic device 102 may re-train the NN model 102A based on the acquired set of 3D scans and the reconstructed 3D mesh sequence. The re-trained NN model 102A may be configured to determine a set of 3D blend-shapes based on a set of input 3D scans.

Examples of the electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The server 104 may include suitable logic, circuitry, and interfaces, and/or code that may be configured to acquire the set of 3D scans 114 including the body portion (such as, the face 112A) of an object (such as, the user 112). The server 104 may determine the set of segments of the body portion (such as, the face 112A) from each 3D scan of the acquired set of 3D scans 114. The server 104 may apply the NN model 102A on the acquired set of 3D scans 114, based on the determined set of segments. The server 104 may determine the set of vertex difference vectors associated with the determined set of segments, based on the application of the NN model 102A. Each vector of the determined set of vertex difference vectors may correspond to the 3D blend-shape associated with the determined set of segments, and each segment of the determined set of segments may be configured to move independently in the 3D blend-shape. The server 104 may reconstruct the 3D mesh sequence based on the determined set of vertex difference vectors. The server 104 may re-train the neural network model 102A based on the acquired set of 3D scans and the reconstructed 3D mesh sequence. The re-trained neural network model 102A may be configured to determine the set of 3D blend-shapes based on the set of input 3D scans.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the set of 3D scans 114. The database 106 may be derived from data off a relational or non-relational database, or a set of comma-separated values (csv) files in conventional or big-data storage. The database 106 may be stored or cached on a device, such as, a server (e.g., the server 104) or the electronic device 102. The device storing the database 106 may be configured to receive a query for a certain 3D scan from the electronic device 102. In response, the device of the database 106 may be configured to retrieve and provide the queried 3D scan e.g., the 3D scan 114A) to the electronic device 102, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The set of image sensors 108 may include suitable logic, circuitry, interfaces, and/or code that may be configured to capture the set of 3D scans 114 of the object, such as, the user 112, from a set of viewpoints. For example, the set of image sensors 108 may include a first image sensor that may capture one or more first 3D scans of the object (e.g., the face 112A of the user 112) from one or more first viewpoints. The set of image sensors 108 may further include a second image sensor that may capture one or more second 3D scans of the object from one or more second viewpoints. The set of 3D scans 114 captured by the set of image sensors 108 may include the one or more first 3D scans and the one or more second 3D scans. For example, the captured set of 3D scans 114 may include the 3D scan 114A, the 3D scan 114B, . . . , and the 3D scan 114N. The set of image sensors 108 may be configured to transmit the captured set of 3D scans 114 to the electronic device 102 and/or the server 104 (for storage on the database 106), via the communication network 110. In an embodiment, each image sensor of the set of image sensors 108 may be pre-calibrated and operations of the set of image sensors 108 may be synchronized such that the set of 3D scans 114 is captured concurrently. Examples of an image sensor may include, but are not limited to, a charge-coupled device (CCD) sensor, a complementary metal-oxide semiconductor (CMOS) sensor, a wide-angle camera, an action camera, a camcorder, a digital still camera, a camera phone, a time-of-flight camera (ToF camera), and a night-vision camera. In one embodiment, the set of image sensors 108 may be integrated or embedded into the electronic device 102.

The communication network 110 may include a communication medium through which the electronic device 102, the server 104, and/or the set of image sensors 108 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and 5th Generation (5G) New Radio (NR)), satellite communication system (using, for example, a network of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The neural network (NN) model 102A may be a machine learning (ML) model, which may be trained to determine the set of vertex difference vectors associated with the determined set of segments. The NN model 102A may be a computational network or a system of artificial neurons, arranged in a set of NN layers, as nodes. The set of NN layers of the NN model 102A may include an input NN layer, one or more hidden NN layers, and an output NN layer. Each layer of the set of NN layers may include one or more nodes (or artificial neurons, represented by circles, for example). Outputs of all nodes in the input NN layer may be coupled to at least one node of hidden NN layer(s). Similarly, inputs of each hidden NN layer may be coupled to outputs of at least one node in other layers of the NN model 102A. Outputs of each hidden NN layer may be coupled to inputs of at least one node in other NN layers of the NN model 102A. Node(s) in the final NN layer may receive inputs from at least one hidden NN layer to output a result. The number of NN layers and the number of nodes in each NN layer may be determined from hyper-parameters of the NN model 102A. Such hyper-parameters may be set before, while training, or after training the NN model 102A on a training dataset.

Each node of the NN model 102A may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other NN layer(s) (e.g., previous NN layer(s)) of the neural network. All or some of the nodes of the neural network may correspond to same or a different same mathematical function.

In training of the NN model 102A, one or more parameters of each node of the neural network may be updated based on whether an output of the final NN layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The NN model 102A may include electronic data, which may be implemented as, for example, a software component of an application executable on the electronic device 102. The NN model 102A may rely on libraries, external scripts, or other logic/instructions for execution by a processing device, such as, the electronic device 102. The NN model 102A may include code and routines configured to enable a computing device, such as the electronic device 102 to perform one or more operations for determination of the set of vertex difference vectors associated with the determined set of segments. Additionally, or alternatively, the NN model 102A may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

Each set of 3D scans 114 may be a 3D image of the body portion (such as, the face 112A) of the object (such as, the user 112). Further each 3D scan, for example, the 3D scan 114A, may depict a particular facial expression of the user 112. For example, the 3D scan 114B may depict that the user 112 is smiling. In an example, the set of image sensors 108 may capture 4D scan data for the user 112, where various expressions of the user 112 may be captured in a given time duration. For example, the set of image sensors 108 may capture a video comprising the set of 3D scans 114 such that a length of the video may be "30" seconds.

In operation, the electronic device 102 may be configured to acquire the set of 3D scans 114 including the body portion (such as, the face 112A) of the object (such as, the user 112). In an example, the set of image sensors 108 may scan the face 112A of the user 112 to capture the set of 3D scans 114. The captured set of 3D scans 114 may be transmitted to the electronic device 102. It should be noted that though FIG. 1 depicts that the set of 3D scans 114 may include the face 112A of the user 112, the teachings of the present disclosure may be also applied to other body portions or other objects, without departure from the scope of the present disclosure. Details related to the acquisition of the set of 3D scans 114 are further provided, for example, in FIG. 3A (at 302).

The electronic device 102 may be configured to determine the set of segments of the body portion (for example, the face 112A) from each 3D scan (for example, the 3D scan 114A) of the acquired set of 3D scans 114. Herein, each 3D scan (for example, the 3D scan 114A) of the acquired set of 3D scans 114 may be subdivided into the set of segments. For example, the 3D scan 114A may be divided into a first segment, a second segment, a third segment, a fourth segment, and a fifth segment. Each segment may be associated with a region of the 3D scan 114A. Details related to the determination of the set of segments are further provided, for example, in FIG. 3A (at 304).

The electronic device 102 may be configured to apply the NN model 102A on the acquired set of 3D scans 114, based on the determined set of segments. Herein, the determined set of segments and the acquired set of 3D scans 114 may be provided as an input to the NN model 102A. Details related to the application of the NN model 102A are further provided, for example, in FIG. 3A (at 306).

The electronic device 102 may be configured to determine the set of vertex difference vectors associated with the determined set of segments, based on the application of the NN model 102A. Each vector of the determined set of vertex difference vectors may correspond to the 3D blend-shape associated with the determined set of segments, and each segment of the determined set of segments may be configured to move independently in the 3D blend-shape. In order to determine the set of vertex difference vectors associated with the determined set of segments, a base 3D blend-shape may be considered. The base 3D blend-shape may correspond to a neutral position. For each segment, an offset of corresponding segment in the 3D scan for example, the 3D scan 114A from the corresponding segment in the base 3D blend-shape may be determined. The vertex difference vector for the corresponding segment may represent the determined offset and mask information associated with the corresponding segment. Details related to the determination of the set of vertex difference vectors are further provided, for example, in FIG. 3B (at 308).

The electronic device 102 may be configured to reconstruct the 3D mesh sequence based on the determined set of vertex difference vectors. The 3D mesh sequence may a plurality of polygons such as, quadrangles or triangles, such that an arrangement of the plurality of polygons may be used for determination of a 3D model. Details related to the reconstruction of the 3D mesh sequence are further provided, for example, in FIG. 3B (at 310).

The electronic device 102 may be configured to re-train the NN model 102A based on the acquired set of 3D scans 114 and the reconstructed 3D mesh sequence. The re-trained NN model 102A may be configured to determine the set of 3D blend-shapes based on the set of input 3D scans. In an embodiment, a matching loss function may be used to determine a difference between the reconstructed 3D mesh sequence and a 3D mesh sequence associated with the acquired set of 3D scans 114. The difference may be fed back as an input to the NN model 102A to re-train the NN model 102A, so that the NN model may learn to match input data, for example, the acquired set of 3D scans 114 to output data, for example, the reconstructed 3D mesh sequence. Upon the re-training of the NN model 102A, a set of input 3D scans may be provided as an input to the re-trained NN model 102A. The re-trained NN model 102A may process the set of input 3D scans to determine the set of 3D blend-shapes. Details related to the re-training of the NN model 102A are further provided, for example, in FIG. 3B (at 312).

Figure 2:
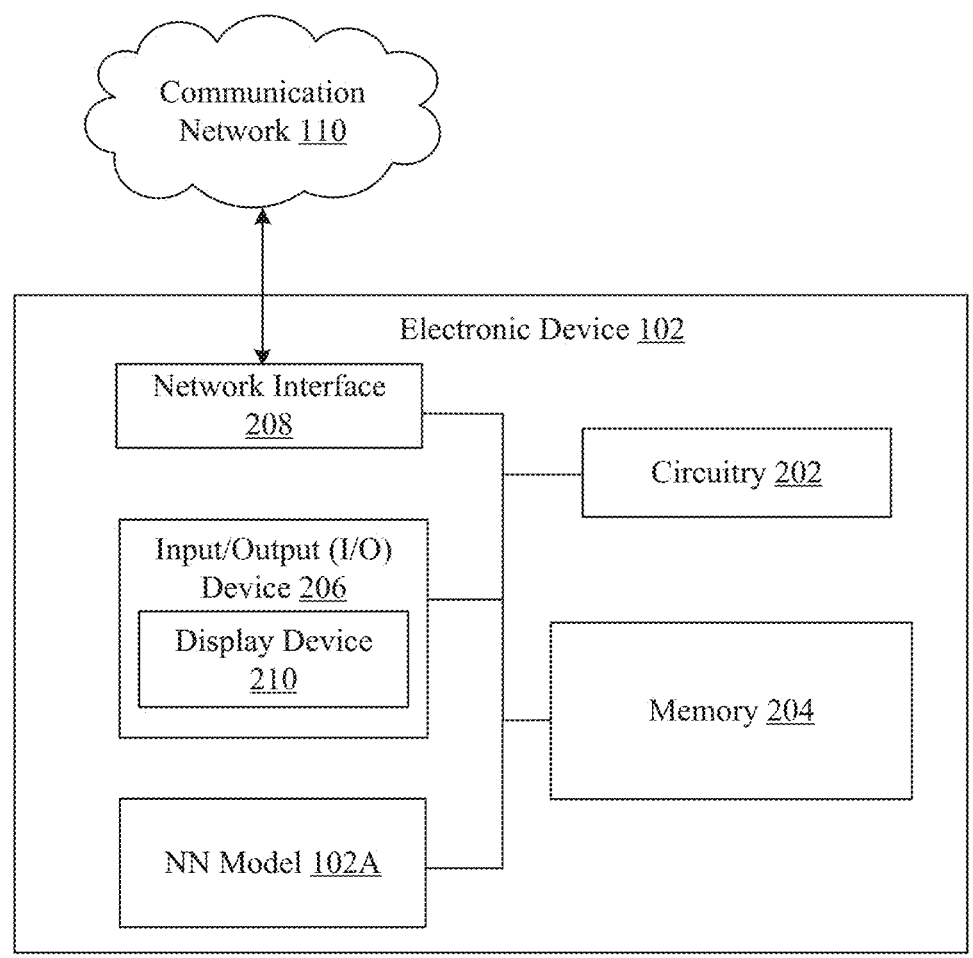
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, a network interface 208, and the NN model 102A. The input/output (I/O) device 206 may include a display device 210.

The circuitry 202 may include suitable logic, circuitry, and/or interfaces that may be configured to execute program instructions associated with different operations to be executed by the electronic device 102. The operations may include set of 3D scans acquisition, set of segments determination, NN model application, vertex difference vectors determination, 3D mesh sequence reconstruction, and NN model retraining. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the set of 3D scans 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a request for determination of the set of 3D blend-shapes based on the set of input 3D scans. The I/O device 206 may be further configured to display or render the determined set of 3D blend-shapes. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102, the server 104, and/or the set of image sensors 108, via the communication network 110. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the determined set of 3D blend-shapes. The display device 210 may be a touch screen which may enable a user (e.g., the user 112) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for generation of 3D blend-shapes from 3D scans using NN model are described further, for example, in FIGS. 3A and 3B.

Figure 3A:
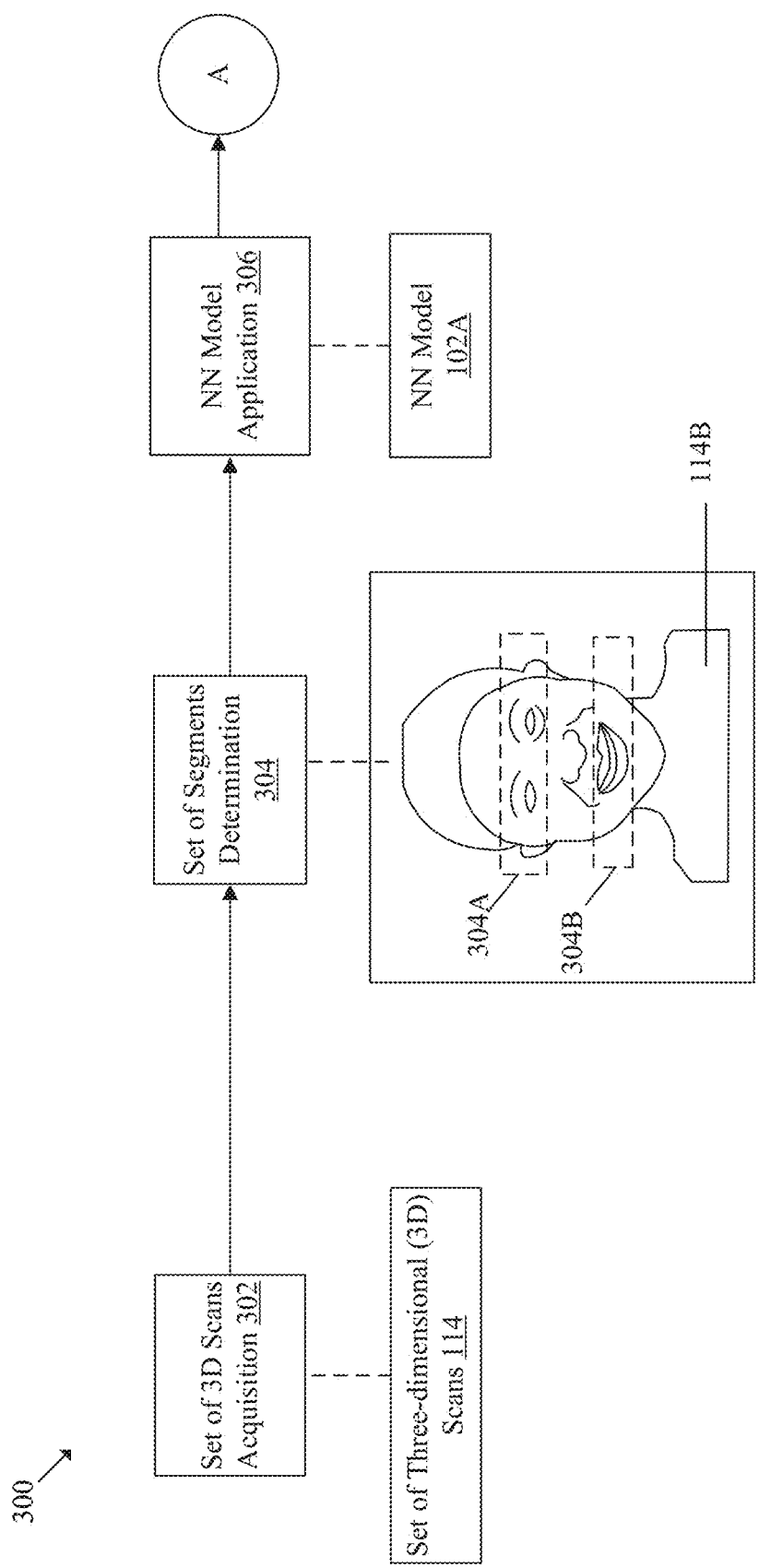
FIGS. 3A and 3B are diagrams that collectively illustrate an exemplary processing pipeline for the generation of the 3D blend-shapes from the 3D scans using the NN model, in accordance with an embodiment of the disclosure.
Figure 3B:
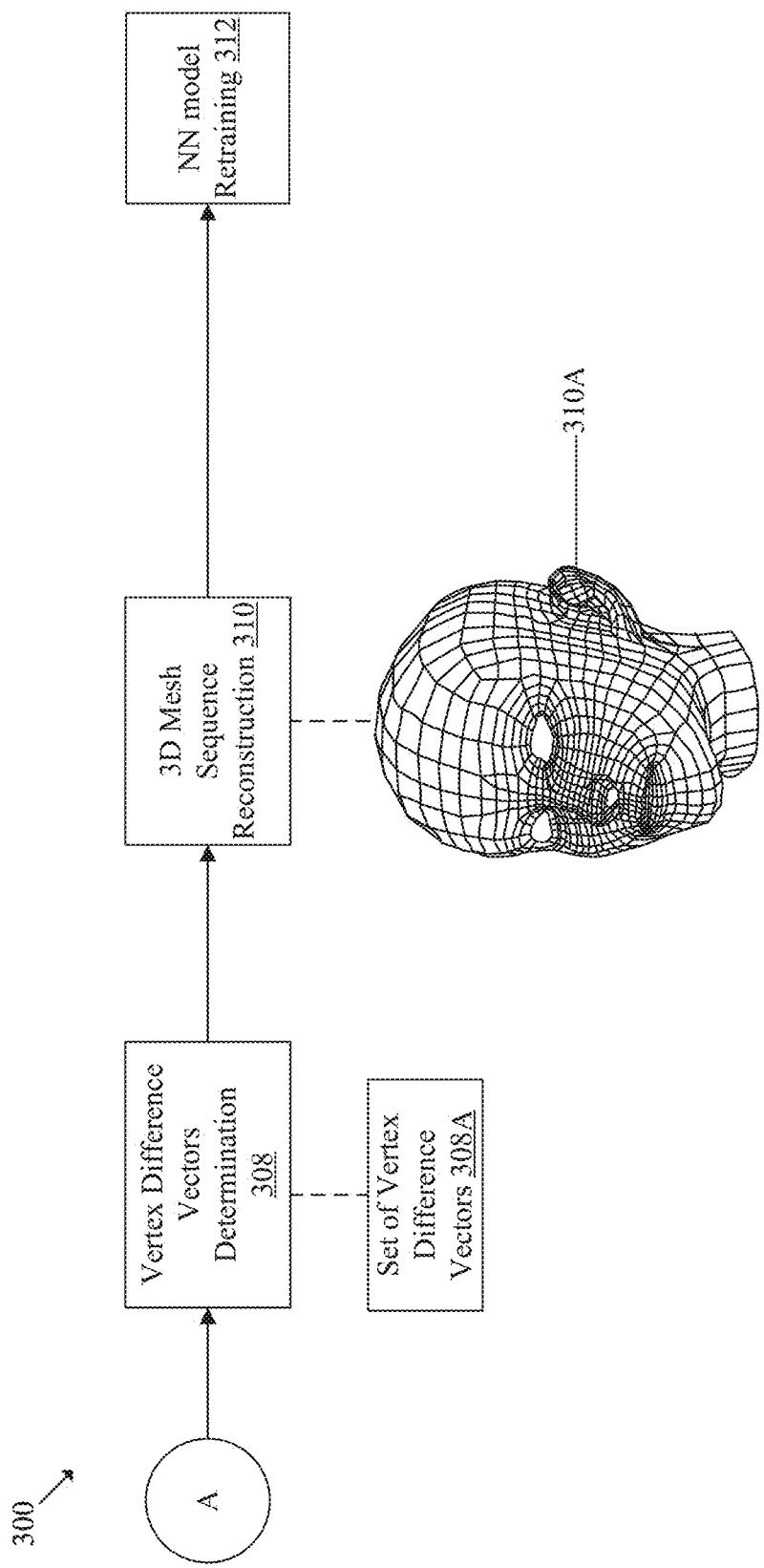

FIGS. 3A and 3B are diagrams that collectively illustrate an exemplary processing pipeline for generation of the 3D blend-shapes from the 3D scans using the NN model, in accordance with an embodiment of the disclosure. FIGS. 3A and 3B are explained in conjunction with elements from FIG. 1 and FIG. 2. With reference to FIGS. 3A and 3B, there is shown, an exemplary processing pipeline 300 that illustrates exemplary operations from 302 to 312 for generation of the 3D blend-shapes from the 3D scans using the NN model. The exemplary operations 302 to 312 may be executed by any computing system, for example, by the electronic device 102 of FIG. 1 or by the circuitry 202 of FIG. 2. FIGS. 3A and 3B further includes the set of 3D scans 114, the 3D scan 114A, a segment 304A of the 3D scan 114A, a segment 304B of the 3D scan 114A, the NN model 102A, a set of vertex difference vectors 308A, and a 3D mesh sequence 310A.

At 302, an operation of the set of 3D scans acquisition may be executed. The circuitry 202 may be configured to acquire the set of 3D scans 114 including the body portion of the object. Herein, the set of image sensors 108 may scan the body portion of the object. In an embodiment, the body portion of the object may correspond to a face of a person. In an example, the object may be the user 112. The set of image sensors 108 may scan the face 112A of the user 112 to capture the set of 3D scans 114 for a period of time. In an embodiment, the captured set of 3D scans 114 may be directly sent to the electronic device 102. In an embodiment, the captured set of 3D scans 114 may be stored in the database 106. The database 106 may receive a request for acquisition of the set of 3D scans 114 from the electronic device 102. The database 106 may verify the request and the set of 3D scans 114 scans may be provided to the circuitry 202 based on the verification of the request.

At 304, an operation of the set of segments determination may be executed. The circuitry 202 may be configured to determine the set of segments of the body portion from each 3D scan of the acquired set of 3D scans 114. Each 3D scan of the acquired set of 3D scans 114 may be divided into the set of segments using image segmentation techniques. For example, the face 112A from each 3D scan of the acquired set of 3D scans 114 may be divided into the set of segments. The set of segments may include a forehead portion, an eyes portions, a left cheek portion, a right cheek portion, a nose portion, a mouth portion, and a chin portion. With reference to FIG. 3A, for example, the face 112A the 3D scan 114A may be divided into the segment 304A and the segment 304B. Herein, the segment 304A may correspond to the eyes portion and the segment 304B may correspond to the mouth portion.

In an embodiment, the determination of the set of segments of the body portion may be based on at least one of a clustering technique or a user input. As discussed, the body portion in each 3D scan of the acquired set of 3D scans 114 may be divided into the set of segments such that each segment may correspond to a region. In an example, the clustering technique may be used to determine the set of segments. Herein, pixels present in each 3D scan, such as, the 3D scan 114B, may be clustered into groups such that a group of similar pixels may correspond to a segment. In other words, the 3D scan, such as, the 3D scan 114B, may correspond to a point cloud. It may be appreciated that the clustering technique used for determination of the set of segments may be an agglomerative clustering or a divisive clustering. In case of an agglomerative clustering, initially, each pixel may be taken as a cluster. Next, inter-cluster distances between each cluster may be determined. Thereafter, two clusters that may be similar to each other and may have inter-cluster distances lesser than a threshold may be merged together as one cluster. The process may be repeated to determine the set of segments. An example of the agglomerative clustering may be a k-means clustering method. In case of a divisive clustering, initially, all pixels associated with a given 3D scan may be taken as a cluster. Thereafter, the cluster may be divided in to a first cluster and a second cluster such that the inter-cluster distances between the first cluster and the second cluster may be greater than a predefined threshold. Next, the process may be repeated for a predefined number of times to determine a set of clusters, such that the set of clusters may correspond to the set of segments. In another example, the set of segments may be determined manually. Herein, the user input may be used to determine the set of segments. The user, such as, user 112, may provide a set of regions such as, a forehead region, a left eye region, a left cheek region, a right cheek region, and the like, into which each 3D scan may be divided to determine the set of segments. Based, on the received user input, the set of segments may be determined.

At 306, an operation of the NN model application may be executed. The circuitry 202 may be configured to apply the NN model 102A on the acquired set of 3D scans 114, based on the determined set of segments. Herein, the acquired set of 3D scans 114 and the determined set of segments may be provided as an input to the NN model 102A. In an embodiment, the NN model 102A may include an encoder model and a decoder model. It may be appreciated that the encoder model may be a type of a machine learning (ML) model that may be used to convert each segment of the determined set of segments associated with each 3D scan of the acquired set of 3D scans 114 into a vector. The vector may be a 2-dimensional (2D) vector or a 3-dimensional (3D) vector. The vector may be provided as an input to the decoder model. In an example, the encoder model and the decoder model may include a first set of recurrent neural network (RNN) layers and a second set of RNN layers, respectively.

At 308, an operation of the set of vertex difference vectors determination may be executed. The circuitry 202 may be configured to determine the set of vertex difference vectors 308A associated with the determined set of segments, based on the application of the NN model 102A. Each vector of the determined set of vertex difference vectors 308A may correspond to the 3D blend-shape associated with the determined set of segments. Further, each segment of the determined set of segments may be configured to move independently in the 3D blend-shape. It may be appreciated that a 3D blend-shape may be a 3D shape that may be used to deform a shape of the body of the object. In an example, the 3D blend-shapes may be used for facial animations. In order to determine the set of vertex difference vectors 308A associated with the determined set of segments, a base 3D blend-shape may be considered. The base 3D blend-shape may correspond to a neutral position. As discussed, each 3D scan, such as, the 3D scan 114A, may be divided into the set of segments. For example, the set of segments associated with the 3D scan 114A may include a first segment corresponding to a left eye portion, a second segment corresponding to a right eye portion, a third segment corresponding to a nose portion, and a fourth segment corresponding to a mouth portion. One or more vertices associated with the first segment in the 3D scan may be compared with one or more vertices associated with the first segment in the base 3D blend-shape to determine a first difference vector. Similarly, one or more vertices associated with the second segment in the 3D scan may be compared with one or more vertices associated with the second segment in the base 3D blend-shape to determine a second difference vector. The determined set of vertex difference vectors 308A may correspond to the 3D blend-shape associated with the determined set of segments. Moreover, each segment of the determined set of segments may be configured to move independently in the 3D blend-shape. For example, the first segment corresponding to the left eye portion, the second segment corresponding to the right eye portion, the third segment corresponding to the nose portion, and the fourth segment corresponding to the mouth portion may move independently so that a facial animation may be determined based on a motion of one or more segments independently. That is, in an example, the left eye portion in the base 3D blend-shape may be open. A 3D blend-shape may be determined by moving only the first segment corresponding to the left eye portion so that the left eye portion may be closed in the determined 3D blend-shape.

In an embodiment, each vector of the set of vertex difference vectors 308A may correspond to at least one of a region-based blend-shape of a segment of the determined set of segments, and mask information associated with the segment. As discussed, for each segment, a vertex difference vector may be determined. The vertex difference vector may correspond to an offset of the segment from the neutral position associated with the corresponding segment. In an example, the segment may be associated with a mouth portion. At neutral position, the mouth portion may be closed. However, in a 3D scan, the mouth portion may be wide open. Therefore, a set of vertices associated with the segment corresponding to the mouth portion in the 3D scan may be offset from a set of vertices associated with the mouth portion in the neutral position. Based on a difference between the set of vertices associated with the segment corresponding to the mouth portion in the 3D scan from the set of vertices associated with the mouth portion in the neutral position, a first vertex difference vector may be determined. Similarly, each of the set of vertex difference vectors 308A may be determined. Further, each vector difference vectors of the set of vertex difference vectors 308A may include a region-based blend-shape. In the aforesaid example, the first vertex difference vector may correspond to a mouth-based blend-shape, where the mouth may be wide open. Further, each vertex difference vector may include the mask information associated with the segment that may be associated with the corresponding difference vector. In an example, the mask information may be used to define a boundary of the vertex difference vector. It may be appreciated that each segment may overlap with one or more other segments. For example, a region of the first segment associated with a mouth portion may overlap with a region of the second segment associated with a nose portion. In an example, the mask information may include information associated with overlapping regions.

In an embodiment, the circuitry 202 may be configured to determine, by the encoder model, a set of weights associated with the determined set of segments, based on the acquired set of 3D scans 114. The circuitry 202 may be configured to determine, by the decoder model, the set of vertex difference vectors 308A associated with the determined set of segments. The set of segments of the body portion (such as, the face 112A) determined from each 3D scan (such as, the 3D scan 114A) may be provided as an input to the encoder model. The encoder model may compress each segment to determine a weight associated with the corresponding segment. Further, the decoder model may determine a vertex difference vector associated with the corresponding segment. Details related to the encoder model and the decoder model are further provided, for example, in FIG. 6.

In an embodiment, the circuitry 202 may be further configured to determine a smoothening function associated with the determined set of segments, wherein the determined smoothening function may be configured to smoothen boundaries of the determined set of segments. As discussed, the determined set of segments may move independently. For example, a first segment associated with a mouth portion in a first 3D scan may depict that the user 112 is smiling. Further, a second 3D scan may be obtained based on a replacement of the first segment associated with the mouth portion in the first 3D scan with a first segment associated with the mouth portion that may depict that the user 112 is frowning. Such replacements and movements of the segments may lead to boundary artefacts. In order to mitigate the aforesaid issue of boundary artefacts, a smoothening function may be used to smoothen boundaries of the determined set of segments.

In an embodiment, the determined smoothening function may correspond to a Laplacian boundary-smoothening function. It may be appreciated that a Laplacian function may detect rapid intensity changes in an image. Hence, the Laplacian boundary-smoothening function may determine boundary of each segment. Thereafter, the Laplacian boundary-smoothening function may smoothen noises that may have appeared in a segment. Details related to smoothening boundaries of the determined set of segments are further provided for example, in FIG. 5.

In an embodiment, a first valid area of a first vector of the set of vertex difference vectors 308A may overlap a second valid area of a second vector of the set of vertex difference vectors 308A, and the overlap between the first valid area and the second valid area may be configured to hide boundaries between segments associated with the first vector and the second vector. As discussed, each vector of the set of vertex difference vectors 308A may correspond to the region-based blend-shape of a segment of the determined set of segments. Further, each segment may overlap with one or more other segments of the determined set of segments. For example, the determined set of segments may include a first segment associated with a forehead region of the user 112, a second segment associated with eyes region of the user 112, a third segment associated with a left cheek region of the user 112, a fourth segment associated with a right cheek region of the user 112, a fifth segment associated with a nose region of the user 112, a sixth segment associated with a mouth region of the user 112, and a seventh segment associated with a chin region of the user 112. A region of the first segment associated with the forehead region of the user 112 may overlap with a region of the second segment associated with the eyes region of the user 112, a region of the third segment associated with the left cheek region of the user 112, and a region of the fourth segment associated with the right cheek region of the user 112. Similarly, a region of the sixth segment associated with the mouth region of the user 112 may overlap with a region of the seventh segment associated with the chin region of the user 112. As each vector of the set of vertex difference vectors 308A may correspond to the region-based blend-shape of a segment of the determined set of segments, such overlapping may be also captured by the vertex difference vectors. Further, such overlapping may help in maintaining a continuity in the blend-shape. For example, a first vector may correspond to a vertex difference vector associated with the mouth region of the user 112 and a second vector may correspond to a vertex difference vector associated with the chin region of the user 112. A first valid area of the first vector may correspond to a region around the mouth region of the user 112 that may be closer to the chin region of the user 112. A second valid area of the second vector may correspond to a region around the chin region of the user 112 that may be closer to the mouth region of the user 112. The first valid area and the second valid area may be overlapped to prevent occurrence of abrupt boundaries around a segment associated with the mouth region and a segment associated with the chin region.

In an embodiment, the overlap between the first valid area and the second valid area may be smoothened using a smoothening function. As discussed, the overlap between the first valid area and the second valid area may hide boundaries. However, in some cases, the overlap between the first valid area and the second valid area may include noise components such as, crests and troughs. Thus, the first valid area and the second valid area may be smoothened using the smoothening function such as, a Laplacian smoothening function.

At 310, an operation of the 3D mesh sequence reconstruction may be executed. The circuitry 202 may be configured to reconstruct the 3D mesh sequence 310A based on the determined set of vertex difference vectors 308A. It may be appreciated that the 3D mesh sequence 310A may be used to build a 3D model. The 3D mesh sequence 310A may include a plurality of polygons such as, quadrangles or triangles. Each polygon may be represented by vertices and edges.

At 312, an operation of the NN model re-training may be executed. The circuitry 202 may be configured to re-train the NN model 102A based on the acquired set of 3D scans 114 and the reconstructed 3D mesh sequence 310A, wherein the re-trained neural network model 102A may be configured to determine a set of 3D blend-shapes based on a set of input 3D scans.

In an embodiment, the circuitry 202 may be configured to determine a regularization function associated with the determined set of segments, based on the determined set of weights and the determined set of vertex difference vectors 308A. The re-training of the neural network model 102A may be further based on the determined regularization function. It may be appreciated that the regularization function may be a function that may be used to calibrate the NN model 102A such that a loss associated with the regularization function may be minimized. For example, the regularization function may be used to prevent overfitting and/or underfitting of the NN model 102A.

In an embodiment, the determined regularization function may correspond to a Lasso (L1) regression function. The Lasso (L1) regression function may be obtained by multiplying a sum of parameters associated with the NN model 102A with a tuning factor. The Lasso (L1) regression function may be determined according to an equation (1), as follows:

$$L1 \text{ regression function} = \lambda \sum_{i=1}^{n} |m_i| \qquad (1)$$

where "$m_i$" may be Lasso regression coefficient associated with the $i^{th}$ vertex difference vector and "$\lambda$" may be a tuning factor. It may be appreciated that, the Lasso (L1) regression function may shrink coefficients of some features that may be of lesser importance to "zero". Thus, such features may be removed.

In an embodiment, the determined regularization function may be configured to reduce a number of the set of 3D blend-shapes. It may be appreciated that with proper selection of the tuning factor "$\lambda$", weights associated with certain 3D blend-shapes may be reduced to "0". Thus, such 3D blend-shapes whose weights are near zero may be avoided. Therefore, the determined regularization function may be used to reduce the number of the set of 3D blend-shapes that may be needed to re-train the NN model 102A.

In an embodiment, the circuitry 202 may be further configured to re-train the neural network model 102A further based on the determined smoothening function. As discussed, the determined set of segments may move independently. Such movements of the segments may lead to the boundary artefacts. In order to mitigate aforesaid issue of boundary artefacts, the smoothening function may be used to hide the boundaries of the determined set of segments. Based on the determined smoothening function and the determined set of vertex difference vectors 308A, the 3D mesh sequence 310A may be reconstructed. The reconstructed 3D mesh sequence 310A may hide boundaries of the determined set of segments. The reconstructed 3D mesh sequence 310A with hidden boundaries may be used to re-train the NN model 102A to enhance a training efficiency.

In an embodiment, the overlap between the first valid area and the second valid area may be smoothened using a smoothening function, and the re-training of the NN model 102A may be further based on the determined smoothening function. The re-training of the NN model 102A further based on the determined smoothening function may help the NN model 102A to determine optimal set of 3D blend-shapes based on the set of input 3D scans. Upon re-training of the NN model 102A, the re-trained NN model 120A may be configured to determine the set of 3D blend-shapes based on the set of input 3D scans. Herein, the set of input 3D scans, that may be similar to the acquired set of 3D scans 114, may be provided as an input to the re-trained NN model 102A. The re-trained NN model 102A may process the set of input 3D scans to determine the set of 3D blend-shapes that may be used for generation of animations.

The disclosed electronic device 102 may be thus, used to automatically determine the set of 3D blend-shapes that may be optimal. That is, a manual task of determination of the set of 3D blend-shapes may be avoided. Moreover, the re-training of the NN model 102A may ensure that the determined set of 3D blend-shapes may be associated with fine facial expressions. The disclosed electronic device 102 may re-train the NN model 102A based on the smoothening function so that the boundaries of each segment may be connected smoothly. Further, the NN model 102A may be re-trained based on the Lasso (L1) regression function that may ensure that a number of the 3D scans in the set of input 3D scans that may be needed for determination of the set of 3D blend-shapes may be minimized. Therefore, a computational cost associated with determination of the set of 3D blend-shapes may be minimized.

In an example, the disclosed electronic device 102 may be used for facial animations. Herein, initially, a 3D mesh sequence model that may have been captured in a photogrammetry studio may be received. The received 3D mesh sequence model may be cleaned based on a mesh cleaning and remeshing technique to obtain a cleaned 3D mesh sequence model. A number of vertices in the cleaned 3D mesh sequence model and the received 3D mesh sequence model may be same. Further, meaning of each vertex in the cleaned 3D mesh sequence model and the received 3D mesh sequence model may be same. Thereafter, facial expressions may be extracted from the cleaned 3D mesh sequence model to reconstruct the 3D mesh sequence. Based on the reconstructed 3D mesh sequence, high quality materials may be generated. Based on the generated high quality materials, rigged 3D mesh sequence may be constructed. Finally, facial animations may be generated based on the constructed rigged 3D mesh sequence.

Figure 4:
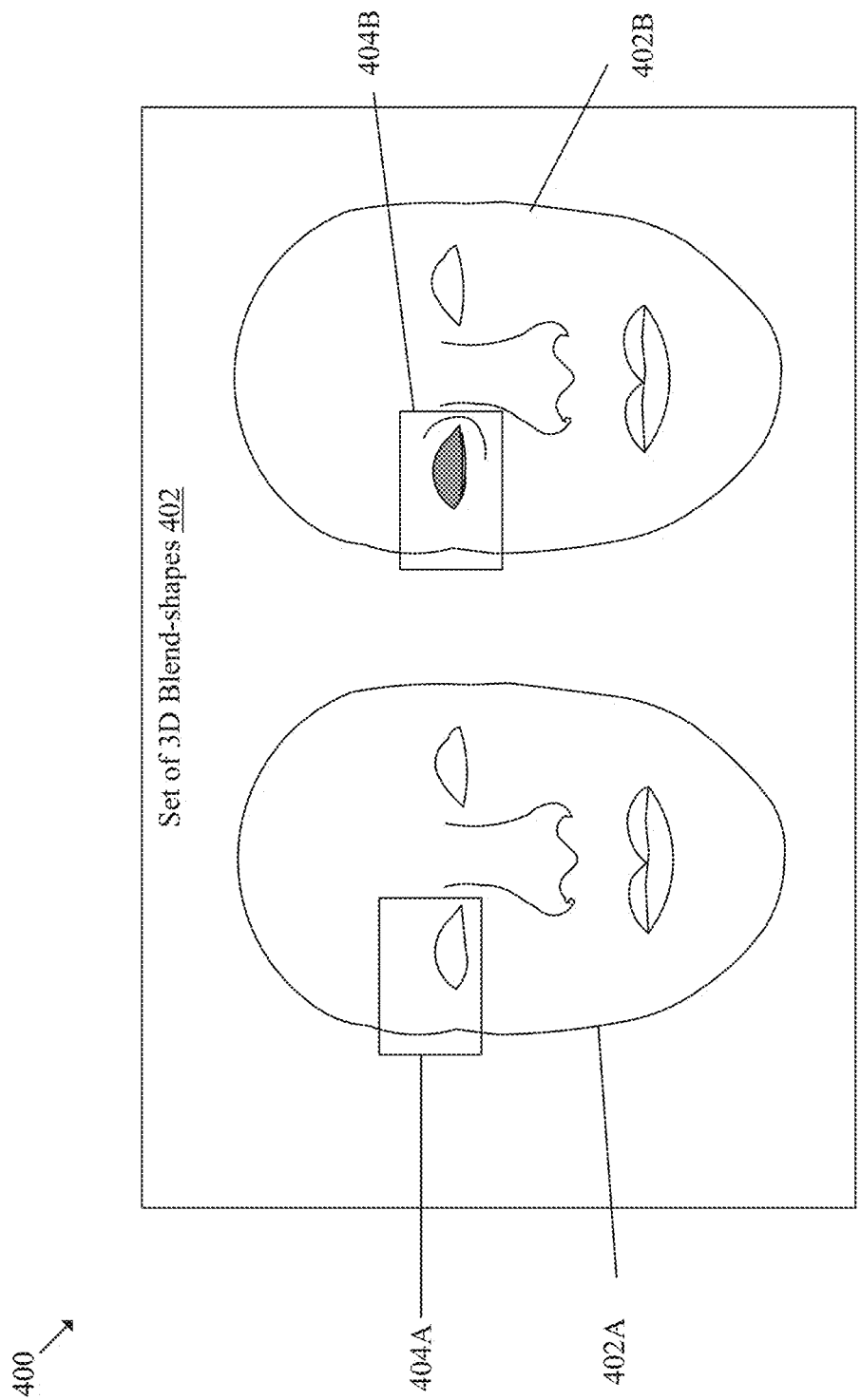
FIG. 4 is a diagram that illustrates an exemplary scenario of a set of 3D blend-shapes, in accordance with an embodiment of the disclosure.

FIG. 4 is a diagram that illustrates an exemplary scenario of a set of 3D blend-shapes, in accordance with an embodiment of the disclosure. FIG. 4 is described in conjunction with elements from FIG. 1, FIG. 2, FIG. 3A, and FIG. 3B. With reference to FIG. 4, there is shown an exemplary scenario 400. The scenario 400 may include a set of 3D blend-shapes 402. The set of 3D blend-shapes 402 may include a 3D blend-shape 402A and a 3D blend-shape 402B. The 3D blend-shape 402A includes a region 404A and the 3D blend-shape 402A includes a region 404B.

Although FIG. 4 shows that the set of 3D blend-shapes 402 includes two 3D blend-shapes, the scope of the disclosure may not be so limited. The set of 3D blend-shapes 402 may include more than two 3D blend-shapes without departure from the scope of the disclosure. A set of operations associated with the scenario 400 is described herein.

With reference to FIG. 4, the 3D blend-shape 402A may be a neutral 3D blend-shape. The region 404A of the 3D blend-shape 402A may depict that a left eye of the face such as, the face 112A, of the person such as, the user 112, may be open. However, the region 404B of the 3D blend-shape 402B may depict that the left eye of the face such as, the face 112A, of the person such as, the user 112, may be closed. In order to generate the 3D blend-shape 402B, the segment associated with the region 404A of the 3D blend-shape 402A may be replaced with the segment associated with the region 404B of the 3D blend-shape 402B.

It should be noted that scenario 400 of FIG. 4 is for exemplary purposes and should not be construed to limit the scope of the disclosure.

Figure 5:
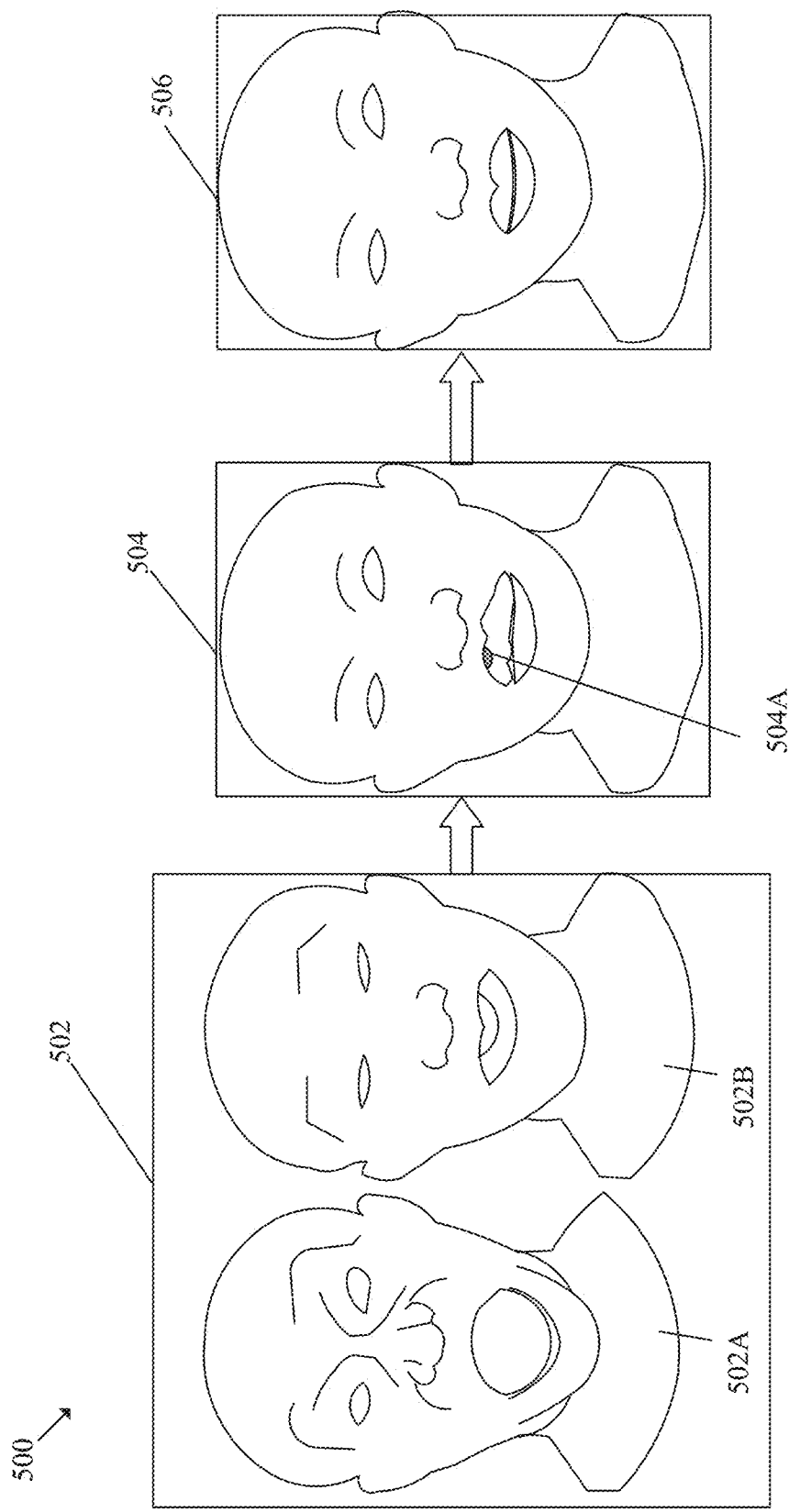
FIG. 5 is a diagram that illustrates an exemplary scenario for boundary smoothening, in accordance with an embodiment of the disclosure.

FIG. 5 is a diagram that illustrates an exemplary scenario for boundary smoothening, in accordance with an embodiment of the disclosure. FIG. 5 is described in conjunction with elements from FIG. 1, FIG. 2, FIG. 3A, FIG. 3B, and FIG. 4. With reference to FIG. 5, there is shown an exemplary scenario 500. The scenario 500 may include a set of 3D scans 502, a 3D blend-shape 504, and a 3D blend-shape 506. The set of 3D scans 502 may include a 3D scan 502A and a 3D scan 502B. The 3D blend-shape 504 may include a boundary artefact 504A.

Although FIG. 5 shows that the set of 3D scans 502 includes two 3D scans, the scope of the disclosure may not be so limited. The set of 3D scans 502 may include more than two 3D scans without departure from the scope of the disclosure. A set of operations associated with the scenario 500 is described herein.

With reference to FIG. 5, the circuitry 202 may acquire the set of 3D scans 502 of a face (for example, the face 112A) of a user (for example, the user 112). A 3D blend-shape may be obtained based on the acquired set of 3D scans 502. In an example, the circuitry 202 may acquire a 3D scan of a neutral face. In an example, the 3D scan of the neutral face may correspond to the 3D scan 502A. Herein, a segment associated with a mouth portion of the face in the 3D scan 502A may be wide open. In order to obtain the 3D blend-shape 504, the segment associated with the mouth portion of the face in the 3D scan 502A may be swapped with the segment associated with a closed mouth portion of the face in the 3D scan 502A. However, the obtained 3D blend-shape 504, may include the boundary artefact 504A around the mouth region of the face in the obtained 3D blend-shape 504. In order to mitigate the aforesaid issue, a smoothening function such as, the Laplacian boundary-smoothening function, may be applied on the obtained 3D blend-shape 504. In some cases, the smoothening function may be only applied on the mouth region of the face in the obtained 3D blend-shape 504 so that the boundary artefact 504A is removed. Based on the application of the smoothening function, the 3D blend-shape 506 may be obtained. The 3D blend-shape 506 may be smooth and may exclude the boundary artefact 504A.

It should be noted that scenario 500 of FIG. 5 is for exemplary purposes and should not be construed to limit the scope of the disclosure.

Figure 6:
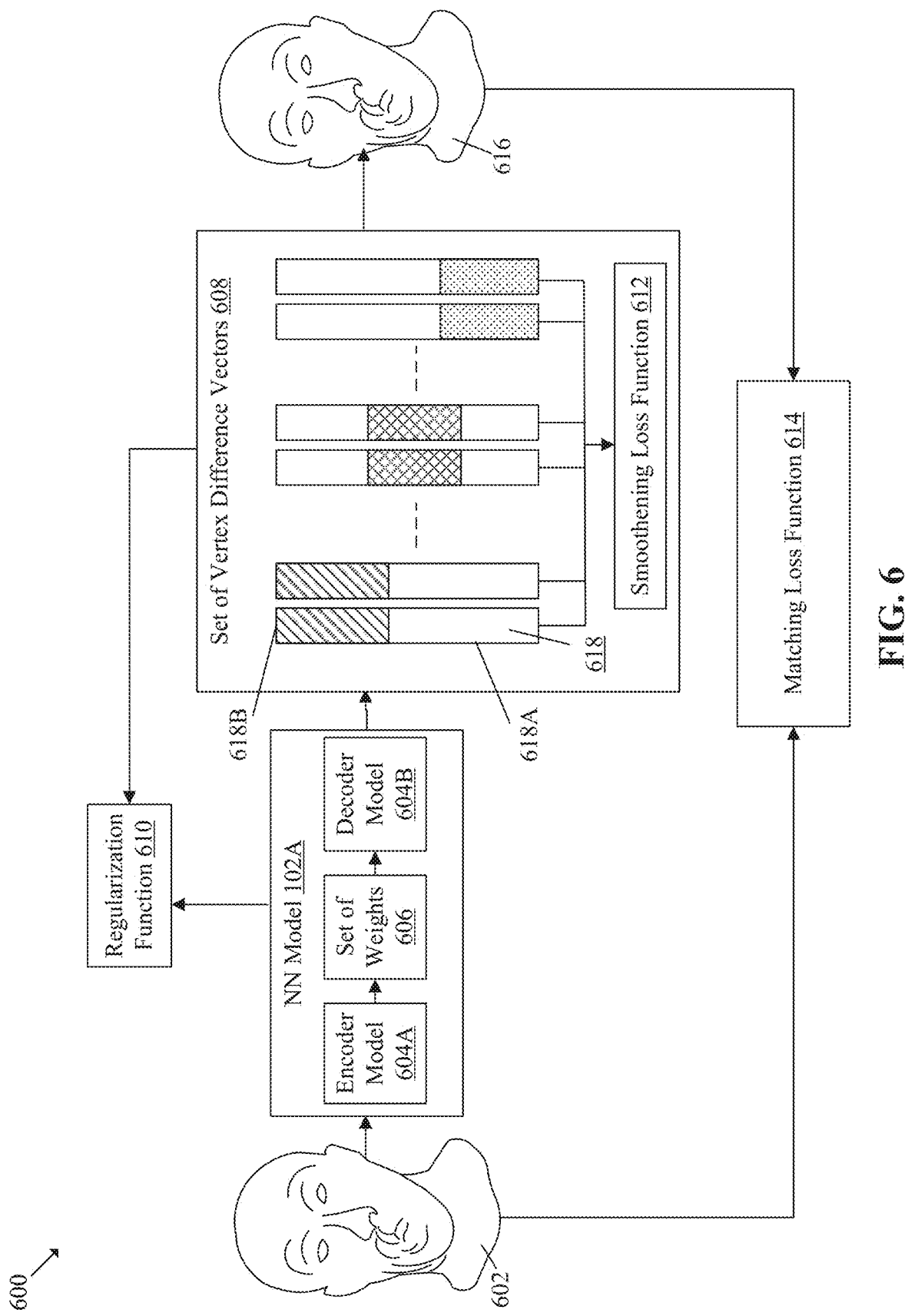
FIG. 6 is a diagram that illustrates an exemplary scenario for re-training of the NN model, in accordance with an embodiment of the disclosure.

FIG. 6 is a diagram that illustrates an exemplary scenario for re-training of the NN model, in accordance with an embodiment of the disclosure. FIG. 6 is described in conjunction with elements from FIG. 1, FIG. 2, FIG. 3A, FIG. 3B, FIG. 4, and FIG. 5. With reference to FIG. 6, there is shown an exemplary scenario 600. The scenario 600 may include a 4D mesh sequence 602, the NN model 102A, an encoder model 604A, a decoder model 604B, a set of weights 606, a set of vertex difference vectors 608, a regularization function 610, a smoothening loss function 612, a matching loss function 614, and a 4D mesh sequence 616. FIG. 6 further depicts a vertex difference vector 618. The vertex difference vector 618 may include mask information 618A and information 618B associated with a region-based blend-shape of a segment. A set of operations associated with the scenario 600 is described herein.

With reference to FIG. 6, the circuitry 202 may acquire the 4D mesh sequence 602. The 4D mesh sequence 602 may be an original 4D mesh sequence of a face such as, the face 112A, of a user such as, the user 112. The circuitry 202 may determine the set of segments based on the acquired 4D mesh sequence 602. The acquired 4D mesh sequence 602 and the determined set of segments may be provided as an input to the encoder model 604A. The encoder model 604A may determine the set of weights 606 associated with the determined set of segments. Further, the decoder model 604B may determine the set of vertex difference vectors 608 associated with the determined set of segments.

As discussed, each vector of the set of vertex difference vectors 608 may correspond to at least one of the region-based blend-shape of the segment of the determined set of segments, and the mask information associated with the segment. For example, with reference to FIG. 6, the vertex difference vector 618 may include the mask information 618A and the information 618B associated with the region-based blend-shape of the segment. Further, the circuitry 202 may determine the 4D mesh sequence 616 by multiplying the weights by the set of weights 606 with corresponding vertex difference vectors of the set of vertex difference vectors 608.

In an embodiment, the circuitry 202 may determine the regularization function 610 associated with the determined set of segments, based on the determined set of weights 606 and the determined set of vertex difference vectors 608. In an example, the regularization function 610 may include L1 regularization function to suppress the determined set of weights 606 by removal of one or more undesired weights. Further the regularization function 610 may include L2 regularization function to remove one or more undesired blend-shapes. Based on the determined regularization function, the NN model 102A may be re-trained.

In an embodiment, the circuitry 202 may determine the smoothening loss function 612. The overlap between the first valid area and the second valid area may be smoothened using the smoothening loss function 612. Based on the determined smoothening function, the NN model 102A may be re-trained. In an embodiment, the circuitry 202 may determine the matching loss function 614 that may be used to determine a difference between an input, such as, the 4D mesh sequence 602, and an output, such as, the 4D mesh sequence 616. In an example, the matching loss function 614 may be determined based on mean square errors between the input, such as, the 4D mesh sequence 602, and the output, such as, the 4D mesh sequence 616. Based on the matching loss function 614, the NN model 102A may be re-trained in order to ensure that the input and the output of the NN model 102A match.

In an embodiment, the NN model 102A may be trained based on a resultant loss function. The resultant loss function may be determined according to an equation (2), as follows:

$$\text{Resultant}_{loss} = \frac{1}{n}\sum_{i=1}^{n}(y_{predicted} - y_{original})^2 + \lambda\sum_{i=1}^{n}|m_i| \qquad (2)$$

where "Resultant$_{loss}$" may be the resultant loss function, "$y_{predicted}$" may be the 4D mesh sequence 616, "$y_{original}$" may be the 4D mesh sequence 602, "$m_i$" may be Lasso regression coefficient associated with the $i^{th}$ vertex difference vector and "$\lambda$" may be a tuning factor.

It should be noted that scenario 600 of FIG. 6 is for exemplary purposes and should not be construed to limit the scope of the disclosure.

Figure 7A:
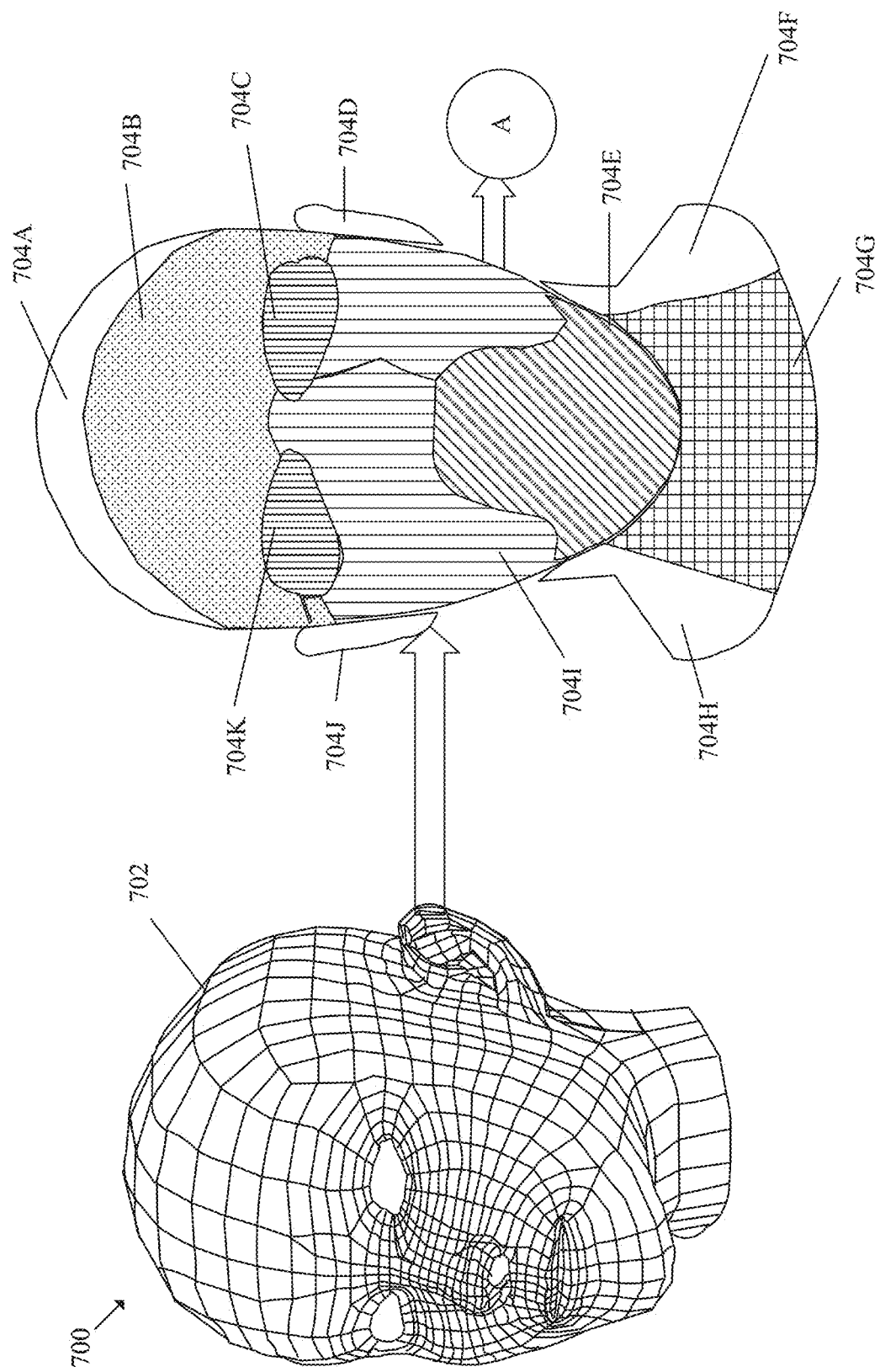
FIGS. 7A and 7B are diagrams that collectively illustrate an exemplary scenario for generation of the 3D blend-shapes from the 3D scans using the NN model, in accordance with an embodiment of the disclosure.
Figure 7B:
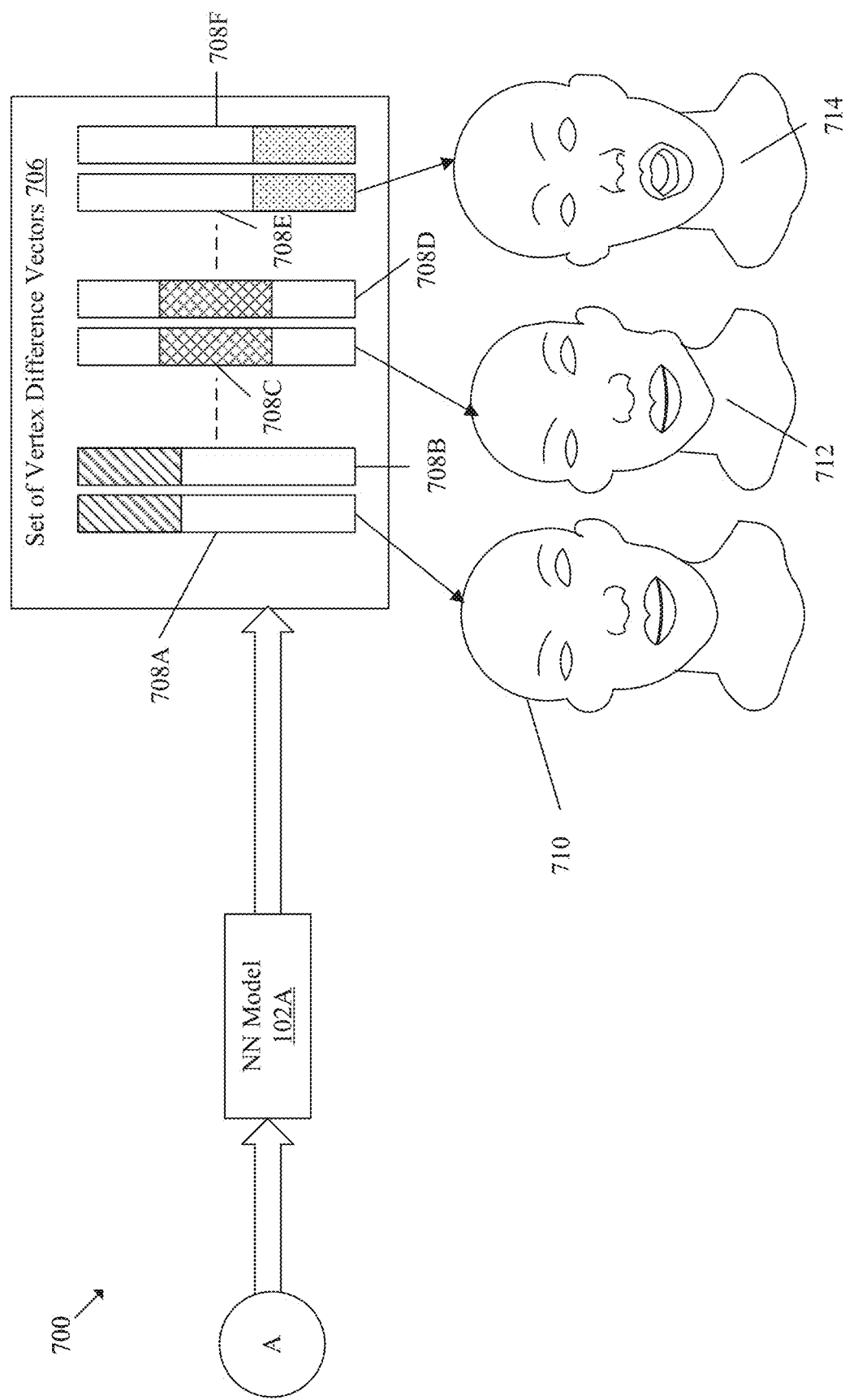

FIGS. 7A and 7B are diagrams that collectively illustrate an exemplary scenario for generation of 3D blend-shapes from 3D scans using the NN model, in accordance with an embodiment of the disclosure. FIGS. 7A and 7B are described in conjunction with elements from FIG. 1, FIG. 2, FIG. 3A, FIG. 3B, FIG. 4, FIG. 5 and FIG. 6. With reference FIGS. 7A and 7B, there is shown an exemplary scenario 700. The scenario 700 may include a 3D scan 702, a set of segments (including a segment 704A, a segment 704B, a segment 704C, a segment 704D, a segment 704E, a segment 704F, a segment 704G, a segment 704H, a segment 704I, a segment 704J, and a segment 704K) and the NN model 102A. Further, the scenario 700 includes a set of vertex difference vectors 706 (including a vertex difference vector 708A, a vertex difference vector 708B, a vertex difference vector 708C, a vertex difference vector 708D, a vertex difference vector 708E, a vertex difference vector 708F), a 3D blend-shape 710, a 3D blend-shape 712, and a 3D blend-shape 714. A set of operations associated with the scenario 700 is described herein.

With reference to FIG. 7A, the circuitry 202 may receive the 3D scan 702. The circuitry 202 may determine the set of segments based on the received 3D scan 702. The determined set of segments may include the segment 704A, the segment 704B, the segment 704C, the segment 704D, the segment 704E, the segment 704F, the segment 704J, the segment 704H, the segment 704I, the segment 704J, the segment 704K. The segment 704A may be associated with a head region of the received 3D scan 702. The segment 704B may be associated with a forehead region of the received 3D scan 702. The segment 704C may be associated with a right eye region of the received 3D scan 702. The segment 704D may be associated with a right ear region of the received 3D scan 702. The segment 704E may be associated with a mouth region of the received 3D scan 702. The segment 704F may be associated with a right neck region of the received 3D scan 702. The segment 704G may be associated with a middle neck region of the received 3D scan 702. The segment 704H may be associated with a left neck region of the received 3D scan 702. The segment 704I may be associated with a cheek and nose region of the received 3D scan 702. The segment 704J may be associated with a left ear region of the received 3D scan 702. The segment 704K may be associated with a left eye region of the received 3D scan 702.

With reference to FIG. 7B, based on application of the NN model 102A, the circuitry 202 may determine the set of vertex difference vectors 706. Each vertex difference vector may include vertex difference information and mask information associated with a segment. The NN model 102A may be re-trained based on the set of vertex difference vectors 706. After re-training, each of the set of vertex difference vectors 706 may be used to determine a 3D blend-shape. A valid area of each vertex difference vector may overlap with a valid area of other vertex difference vectors in order to hide region boundaries. Based on the vertex difference vector 708A and the vertex difference vector 708B, the 3D blend-shape 710 may be determined. Based on the vertex difference vector 708C and the vertex difference vector 708D, the 3D blend-shape 712 may be determined. Based on the vertex difference vector 708E and the vertex difference vector 708F, the 3D blend-shape 714 may be determined.

It should be noted that scenario 700 of FIGS. 7A and 7B is for exemplary purposes and should not be construed to limit the scope of the disclosure.

Figure 8:
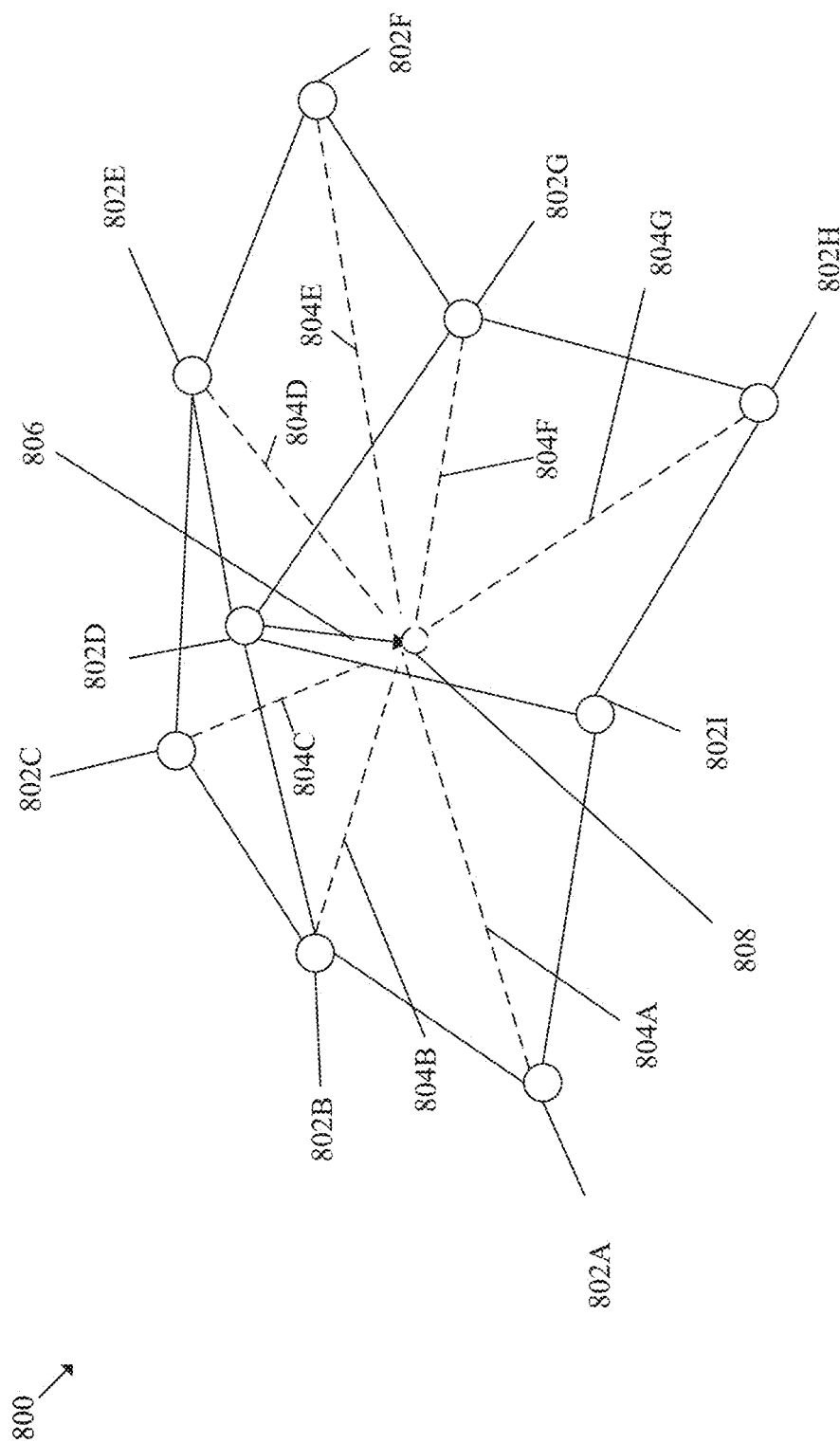
FIG. 8 is a diagram that illustrates an exemplary scenario for a Laplacian boundary-smoothening function, in accordance with an embodiment of the disclosure.

FIG. 8 is a diagram that illustrates an exemplary scenario for the Laplacian boundary-smoothening function, in accordance with an embodiment of the disclosure. FIG. 8 is described in conjunction with elements from FIG. 1, FIG. 2, FIG. 3A, FIG. 3B, FIG. 4, FIG. 5, FIG. 6, FIG. 7A, and FIG. 7B. With reference FIG. 8, there is shown an exemplary scenario 800. The scenario 800 may include a node 802A, a node 802B, a node 802C, a node 802D, a node 802E, a node 802F, a node 802G, a node 802H, a node 802I, a line 804A, a line 804B, a line 804C, a line 804D, a line 804E, a line 804F, a line 804G, an arrowhead 806, and a centroid position 808. A set of operations associated with the scenario 800 is described herein.

For example, with reference to FIG. 8, the node 802A, the node 802B, the node 802C, the node 802D, the node 802E, the node 802F, the node 802G, the node 802H, and the node 802I may constitute a 3D mesh. In order to smoothen the 3D mesh, positions of one or more nodes may be adjusted by using the Laplacian boundary-smoothening function such that a topography of the mesh after adjusting the positions of one or more nodes may remain unchanged. The Laplacian boundary-smoothening function may reposition each node with respect to a centroid position, where the centroid position may be determined by calculating a centroid of a first set of nodes that may be first order neighbors of the corresponding node. For example, with reference to FIG. 8, the centroid position 808 for the node 802D may be obtained calculating the centroid of the node 802A, the node 802B, the node 802C, the node 802E, the node 802F, the node 802G, and the node 802H. As indicated by the arrowhead 806, the node 802D may be moved to the centroid position 808. Similarly, centroid position for nodes other than the node 802D may be determined such that the 3D mesh may be smoothened. Further, movement of nodes from an initial position to the centroid position may be such that the topography of the 3D mesh may remain same.

It should be noted that scenario 800 of FIG. 8 is for exemplary purposes and should not be construed to limit the scope of the disclosure.

Figure 9:
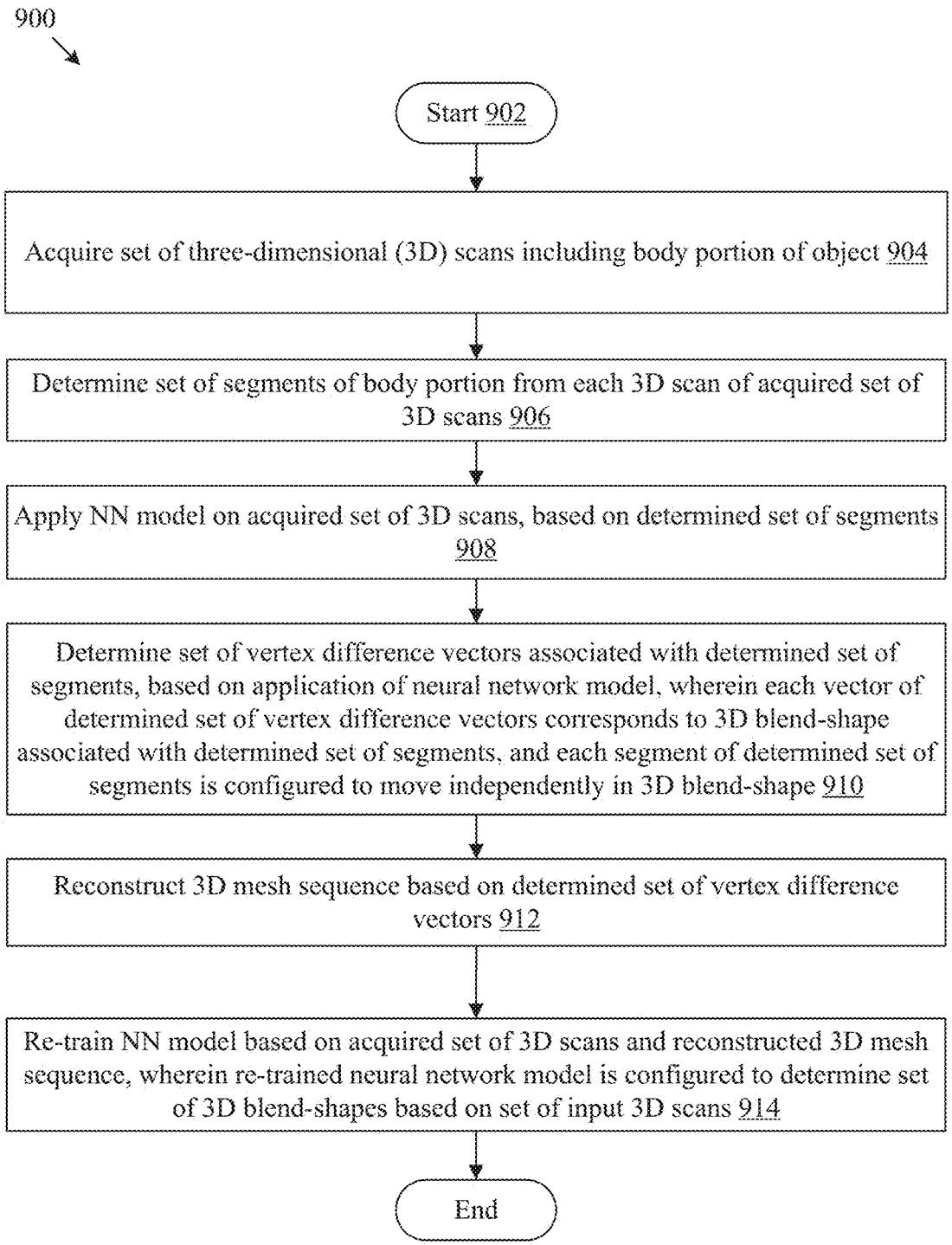
FIG. 9 is a flowchart that illustrates operations of an exemplary method for generation of the 3D blend-shapes from the 3D scans using the NN model, in accordance with an embodiment of the disclosure.

FIG. 9 is a flowchart that illustrates operations of an exemplary method for generation of 3D blend-shapes from 3D scans using NN model, in accordance with an embodiment of the disclosure. FIG. 9 is described in conjunction with elements from FIG. 1, FIG. 2, FIG. 3A, FIG. 3B, FIG. 4, FIG. 5, FIG. 6, FIG. 7A, FIG. 7B, and FIG. 8. With reference to FIG. 9, there is shown a flowchart 900. The flowchart 900 may include operations from 902 to 914 and may be implemented by the electronic device 102 of FIG. 1 or by the circuitry 202 of FIG. 2. The flowchart 900 may start at 902 and proceed to 904.

At 904, the set of 3D scans 114 including the body portion, such as, the face 112A of the object, such as, the user 112, may be acquired. The circuitry 202 may be configured to acquire the set of 3D scans 114 including the body portion, such as, the face 112A, of the object, such as, the user 112. Details related to the acquisition of the set of 3D scans 114 are further provided, for example, in FIG. 3A (at 302).

At 906, the set of segments of the body portion (for example, the face 112A) may be determined from each 3D scan (for example, the 3D scan 114A) of the acquired set of 3D scans 114. The circuitry 202 may be configured to determine the set of segments of the body portion (for example, the face 112A) from each 3D scan (for example, the 3D scan 114A) of the acquired set of 3D scans 114. Details related to the determination of the set of segments are further provided, for example, in FIG. 3A (at 304).

At 908, the NN model 102A may be applied on the acquired set of 3D scans 114, based on the determined set of segments. The circuitry 202 may be configured to apply the NN model 102A on the acquired set of 3D scans 114, based on the determined set of segments. Details related to the application of the NN model 102A are further provided, for example, in FIG. 3A (at 306).

At 910, the set of vertex difference vectors 308A associated with the determined set of segments may be determined, based on the application of the NN model 102A, wherein each vector of the determined set of vertex difference vectors 308A may correspond to the 3D blend-shape associated with the determined set of segments, and each segment of the determined set of segments may be configured to move independently in the 3D blend-shape. The circuitry 202 may be configured to determine the set of vertex difference vectors 308A associated with the determined set of segments, based on the application of the NN model 102A, wherein each vector of the determined set of vertex difference vectors 308A may correspond to the 3D blend-shape associated with the determined set of segments, and each segment of the determined set of segments may be configured to move independently in the 3D blend-shape. Details related to the determination of the set of vertex difference vectors 308A are further provided, for example, in FIG. 3B (at 308).

At 912, the 3D mesh sequence 310A may be reconstructed based on the determined set of vertex difference vectors 308A. The circuitry 202 may be configured to reconstruct the 3D mesh sequence 310A based on the determined set of vertex difference vectors 308A. Details related to the reconstruction of the 3D mesh sequence 310A are further provided, for example, in FIG. 3B (at 310).

At 914, the NN model 102A may be re-trained based on the acquired set of 3D scans 114 and the reconstructed 3D mesh sequence 310A, wherein the re-trained NN model 102A may be configured to determine the set of 3D blend-shapes based on the set of input 3D scans. The circuitry 202 may be configured to re-train the NN model 102A based on the acquired set of 3D scans 114 and the reconstructed 3D mesh sequence 310A, wherein the re-trained NN model 102A may be configured to determine the set of 3D blend-shapes based on the set of input 3D scans. Details related to the re-training of the NN model 102A are further provided, for example, in FIG. 3B (at 312). Control may pass to end.

Although the flowchart 900 is illustrated as discrete operations, such as, 904, 906, 908, 910, 912, and 914, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include acquisition of a set of 3D scans (e.g., the set of 3D scans 114) including the body portion such as, a face (e.g., the face 112A) of the object, such as, a user (e.g., the user 112). The operations may further include determination of the set of segments of the body portion (for example, the face 112A) from each 3D scan (for example, the 3D scan 114A) of the acquired set of 3D scans 114. The operations may further include application of a neural network (NN) model (e.g., the NN model 102A) on the acquired set of 3D scans 114, based on the determined set of segments. The operations may further include determination of a set of vertex difference vectors (e.g., the set of vertex difference vectors 308A) associated with the determined set of segments, based on the application of the NN model 102A, wherein each vector of the determined set of vertex difference vectors 308A may correspond to the 3D blend-shape associated with the determined set of segments, and each segment of the determined set of segments may be configured to move independently in the 3D blend-shape. The operations may further include reconstruction of a 3D mesh sequence (e.g., the 3D mesh sequence 310A) based on the determined set of vertex difference vectors 308A. The operations may further include re-training the NN model 102A based on the acquired set of 3D scans 114 and the reconstructed 3D mesh sequence 310A, wherein the re-trained NN model 102A may be configured to determine the set of 3D blend-shapes based on a set of input 3D scans.

Exemplary aspects of the disclosure may provide an electronic device (such as, the electronic device 102 of FIG. 1) that includes circuitry (such as, the circuitry 202). The circuitry 202 may be configured to acquire the set of 3D scans 114 including the body portion such as, the face 112A of the object, such as, the user 112. The circuitry 202 may be configured to determine the set of segments of the body portion (for example, the face 112A) from each 3D scan (for example, the 3D scan 114A) of the acquired set of 3D scans 114. The circuitry 202 may be configured to apply the NN model 102A on the acquired set of 3D scans 114, based on the determined set of segments. The circuitry 202 may be configured to determine the set of vertex difference vectors 308A associated with the determined set of segments, based on the application of the NN model 102A, wherein each vector of the determined set of vertex difference vectors 308A may correspond to the 3D blend-shape associated with the determined set of segments, and each segment of the determined set of segments may be configured to move independently in the 3D blend-shape. The circuitry 202 may be configured to reconstruct the 3D mesh sequence 310A based on the determined set of vertex difference vectors 308A. The circuitry 202 may be configured to re-train the NN model 102A based on the acquired set of 3D scans 114 and the reconstructed 3D mesh sequence 310A, wherein the re-trained NN model 102A may be configured to determine the set of 3D blend-shapes based on the set of input 3D scans.

In an embodiment, the body portion of the object may correspond to the face 112A of the person (for example, the user 112).

In an embodiment, the determination of the set of segments of the body portion (for example, the face 112A) may be based on at least one of a clustering technique or a user input.

In an embodiment, the NN model 102A may include an encoder model (e.g., the encoder model 604A) and a decoder model (e.g., the decoder model 604B).

In an embodiment, the circuitry 202 may be further configured to determine, by the encoder model 604A, a set of weights (e.g., the set of weights 606) associated with the determined set of segments, based on the acquired set of 3D scans 114. The circuitry 202 may be further configured to determine, by the decoder model 604B, the set of vertex difference vectors 608 associated with the determined set of segments. The circuitry 202 may be further configured to determine a regularization function (e.g., the regularization function 610) associated with the determined set of segments, based on the determined set of weights 606 and the determined set of vertex difference vectors 608, wherein the re-training of the NN model 102A may be further based on the determined regularization function 610.

In an embodiment, the determined regularization function 610 may be configured to reduce a number of the set of 3D blend-shapes.

In an embodiment, the determined regularization function 610 may correspond to the lasso (L1) regression function.

In an embodiment, the circuitry 202 may be further configured to determine a smoothening function (e.g., the smoothening loss function 612) to associated with the determined set of segments, wherein the determined smoothening loss function 612 may be configured to smoothen boundaries of the determined set of segments, and the re-training of the NN model 102A may be further based on the determined smoothening loss function 612.

In an embodiment, the determined smoothening loss function 612 may correspond to the Laplacian boundary-smoothening function.

In an embodiment, each vector of the set of vertex difference vectors may correspond to at least one of the region-based blend-shape of the segment of the determined set of segments, and the mask information associated with the segment.

In an embodiment, the first valid area of the first vector of the set of vertex difference vectors may overlap the second valid area of the second vector of the set of vertex difference vectors, and the overlap between the first valid area and the second valid area may be configured to hide boundaries between segments associated with the first vector and the second vector.

In an embodiment, the overlap between the first valid area and the second valid area may be smoothened using the smoothening function, and the re-training of the NN model 102A may be further based on the determined smoothening function.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
circuitry configured to:
acquire a set of three-dimensional (3D) scans including a body portion of an object;
determine a set of segments of the body portion from each 3D scan of the acquired set of 3D scans;
apply, based on the determined set of segments, a neural network model on the acquired set of 3D scans, wherein the neural network model includes an encoder model and a decoder model;
determine, by the encoder model, based on the acquired set of 3D scans, a set of weights associated with the determined set of segments;
determine, by the decoder model, a set of vertex difference vectors associated with the determined set of segments, wherein
each vector of the determined set of vertex difference vectors corresponds to a 3D blend-shape associated with the determined set of segments, and
each segment of the determined set of segments is configured to move independently in the 3D blend-shape;
determine, based on the determined set of weights and the determined set of vertex difference vectors, a regularization function associated with the determined set of segments;
reconstruct a 3D mesh sequence based on the determined set of vertex difference vectors; and
re-train the neural network model based on the acquired set of 3D scans, the determined regularization function, and the reconstructed 3D mesh sequence, wherein
the re-trained neural network model is configured to determine a set of 3D blend-shapes based on a set of input 3D scans, and
the set of 3D blend-shapes includes the 3D blend-shape.

2. The electronic device according to claim 1, wherein the body portion of the object corresponds to a face of a person.

3. The electronic device according to claim 1, wherein the determination of the set of segments of the body portion is based on at least one of a clustering technique or a specific input.

4. The electronic device according to claim 1, wherein the determined regularization function is configured to reduce a number of the set of 3D blend-shapes.

5. The electronic device according to claim 1, wherein the determined regularization function corresponds to a Lasso (L1) regression function.

6. The electronic device according to claim 1, wherein the circuitry is further configured to:
determine a smoothening function associated with the determined set of segments, wherein
the determined smoothening function is configured to smoothen boundaries of the determined set of segments, and
the re-trained neural network model is further based on the determined smoothening function.

7. The electronic device according to claim 6, wherein the determined smoothening function corresponds to a Laplacian boundary-smoothening function.

8. The electronic device according to claim 1, wherein the each vector of the determined set of vertex difference vectors corresponds to at least one of:
a region-based blend-shape of a segment of the determined set of segments, or
mask information associated with the segment.

9. The electronic device according to claim 1, wherein the determined set of vertex difference vectors includes a first vector and a second vector,
the first vector has a first valid area,
the second vector has a second valid area,
the first valid area overlaps with the second valid area, and
the overlap between the first valid area and the second valid area hide boundaries between segments associated with the first vector and the second vector.

10. The electronic device according to claim 9, wherein the overlap between the first valid area and the second valid area is smoothened with a smoothening function, and
the re-trained neural network model is based on the smoothening function.

11. A method, comprising:
in an electronic device:
acquiring a set of three-dimensional (3D) scans including a body portion of an object;
determining a set of segments of the body portion from each 3D scan of the acquired set of 3D scans;
applying, based on the determined set of segments, a neural network model on the acquired set of 3D scans, wherein the neural network model includes an encoder model and a decoder model;
determining, by the encoder model, based on the acquired set of 3D scans, a set of weights associated with the determined set of segments;
determining, by the decoder model, a set of vertex difference vectors associated with the determined set of segments, wherein
each vector of the determined set of vertex difference vectors corresponds to a 3D blend-shape associated with the determined set of segments, and each segment of the determined set of segments is configured to move independently in the 3D blend-shape;

determining, based on the determined set of weights and the determined set of vertex difference vectors, a regularization function associated with the determined set of segments;

reconstructing a 3D mesh sequence based on the determined set of vertex difference vectors; and re-training the neural network model based on the acquired set of 3D scans, the determined regularization function, and the reconstructed 3D mesh sequence, wherein the re-trained neural network model is configured to determine a set of 3D blend-shapes based on a set of input 3D scans, and the set of 3D blend-shapes includes the 3D blend-shape.

12. The method according to claim 11, wherein the determined regularization function is configured to reduce a number of the set of 3D blend-shapes.

13. The method according to claim 11, wherein the determined regularization function corresponds to a Lasso (L1) regression function.

14. The method according to claim 11, further comprising:

determining a smoothening function associated with the determined set of segments, wherein the determined smoothening function is configured to smoothen boundaries of the determined set of segments, and the re-training of the neural network model is further based on the determined smoothening function.

15. The method according to claim 14, wherein the determined smoothening function corresponds to a Laplacian boundary-smoothening function.

16. A non-transitory computer-readable medium having stored thereon, computer-executable instructions that when executed by an electronic device, cause the electronic device to execute operations, the operations comprising:

acquiring a set of three-dimensional (3D) scans including a body portion of an object;

determining a set of segments of the body portion from each 3D scan of the acquired set of 3D scans;

applying, based on the determined set of segments, a neural network model on the acquired set of 3D scans, wherein the neural network model includes an encoder model and a decoder model;

determining, by the encoder model, based on the acquired set of 3D scans, a set of weights associated with the determined set of segments;

determining, by the decoder model, a set of vertex difference vectors associated with the determined set of segments, wherein each vector of the determined set of vertex difference vectors corresponds to a 3D blend-shape associated with the determined set of segments, and each segment of the determined set of segments is configured to move independently in the 3D blend-shape;

determining, based on the determined set of weights and the determined set of vertex difference vectors, a regularization function associated with the determined set of segments;

reconstructing a 3D mesh sequence based on the determined set of vertex difference vectors; and re-training the neural network model based on the acquired set of 3D scans, the determined regularization function, and the reconstructed 3D mesh sequence, wherein the re-trained neural network model is configured to determine a set of 3D blend-shapes based on a set of input 3D scans, and the set of 3D blend-shapes includes the 3D blend-shape.

* * * * *